(12) United States Patent
Tononishi et al.

(10) Patent No.: US 12,218,375 B2
(45) Date of Patent: Feb. 4, 2025

(54) ENERGY STORAGE APPARATUS

(71) Applicant: GS Yuasa International Ltd., Kyoto (JP)

(72) Inventors: Masamitsu Tononishi, Kyoto (JP); Makoto Yoda, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 758 days.

(21) Appl. No.: 17/418,915

(22) PCT Filed: Jun. 20, 2019

(86) PCT No.: PCT/JP2019/024405
§ 371 (c)(1),
(2) Date: Jun. 28, 2021

(87) PCT Pub. No.: WO2020/136946
PCT Pub. Date: Jul. 2, 2020

(65) Prior Publication Data
US 2022/0123421 A1 Apr. 21, 2022

(30) Foreign Application Priority Data
Dec. 28, 2018 (JP) .................................. 2018-247503

(51) Int. Cl.
*H01M 50/293* (2021.01)
*H01M 50/244* (2021.01)
(Continued)

(52) U.S. Cl.
CPC ....... *H01M 50/293* (2021.01); *H01M 50/244* (2021.01); *H01M 50/209* (2021.01); *H01M 50/227* (2021.01); *H01M 50/276* (2021.01)

(58) Field of Classification Search
CPC .. H01M 50/204; H01M 50/20; H01M 50/244; H01M 50/293; H01M 50/289
(Continued)

(56) References Cited

U.S. PATENT DOCUMENTS

2010/0216002 A1 8/2010 Tanino
2012/0003526 A1* 1/2012 Kume ............... H01M 10/0481
429/151
(Continued)

FOREIGN PATENT DOCUMENTS

JP 2007-250423 A 9/2007
JP 2009-238643 A 10/2009
(Continued)

OTHER PUBLICATIONS

International Search Report (ISR) (PCT Form PCT/ISA/210, in PCT/JP2019/024405, dated Sep. 10, 2019.

*Primary Examiner* — James M Erwin
*Assistant Examiner* — John S Medley
(74) *Attorney, Agent, or Firm* — MCGINN I.P. LAW GROUP, PLLC

(57) ABSTRACT

An energy storage apparatus includes: an energy storage device including a case in which a joining portion is formed; and a support member which is arranged so as to extend in an elongated shape along the joining portion at a position outside the case and along the joining portion in a side surface portion of the case, and supports the side surface portion.

15 Claims, 12 Drawing Sheets

(51) Int. Cl.
*H01M 50/209* (2021.01)
*H01M 50/227* (2021.01)
*H01M 50/276* (2021.01)

(58) Field of Classification Search
USPC .......................................................... 429/163
See application file for complete search history.

(56) References Cited

U.S. PATENT DOCUMENTS

| | | | |
|---|---|---|---|
| 2016/0093855 A1* | 3/2016 | Tononishi | H01M 50/20 |
| | | | 429/156 |
| 2016/0285056 A1 | 9/2016 | Kim et al. | |
| 2017/0237046 A1* | 8/2017 | Shindo | H01M 4/66 |
| | | | 429/163 |
| 2017/0358785 A1 | 12/2017 | Hattori et al. | |
| 2018/0102573 A1 | 4/2018 | Tsuruta et al. | |
| 2018/0130991 A1* | 5/2018 | Kim | H01M 50/289 |
| 2018/0309103 A1 | 10/2018 | Kobayashi et al. | |
| 2018/0351142 A1* | 12/2018 | Aoki | H01M 50/291 |

FOREIGN PATENT DOCUMENTS

| | | |
|---|---|---|
| JP | 2010-061908 A | 3/2010 |
| JP | 2010-198988 A | 9/2010 |
| JP | 2011-198472 A | 10/2011 |
| JP | 2012-022937 A | 2/2012 |
| JP | 2013-077497 A | 4/2013 |
| JP | 2013-091085 A | 5/2013 |
| JP | 2015-106443 A | 6/2015 |
| JP | 2016-033914 A | 3/2016 |
| JP | 2016-081725 A | 5/2016 |
| JP | 2016-152203 A | 8/2016 |
| JP | 2017-041449 A | 2/2017 |
| JP | 2017-054865 A | 3/2017 |
| JP | 2017-068986 A | 4/2017 |
| JP | 2018-063838 A | 4/2018 |
| JP | 2018-081885 A | 5/2018 |
| JP | 2018-181765 A | 11/2018 |
| WO | 2016/136248 A | 9/2016 |
| WO | WO 2017/126285 A1 | 7/2017 |

* cited by examiner

ENERGY STORAGE APPARATUS

TECHNICAL FIELD

The present invention relates to an energy storage apparatus including an energy storage device including a case.

BACKGROUND ART

Conventionally, an energy storage apparatus including an energy storage device including a case is widely known. Patent Document 1 discloses a battery module (energy storage apparatus) in which heat transfer plates are arranged side by side between battery cells (energy storage devices) each including an accommodating case (case), and these are sandwiched from both sides in the arrangement direction.

PRIOR ART DOCUMENT

Patent Document

Patent Document 1: JP-A-2015-106443

SUMMARY OF THE INVENTION

Problems to be Solved by the Invention

In the energy storage apparatus having the above-mentioned conventional configuration, the case of the energy storage device may be damaged.

An object of the present invention is to provide an energy storage apparatus capable of suppressing damage of a case of an energy storage device.

Means for Solving the Problems

According to one aspect of the present invention, there is provided an energy storage apparatus including: an energy storage device including a case in which a joining portion is formed; and a support member which is arranged so as to extend in an elongated shape along the joining portion at a position outside the case and along the joining portion in a side surface portion of the case, and supports the side surface portion.

The present invention can be realized not only as such an energy storage apparatus but also as a support member (and a holding member) included in the energy storage apparatus.

Advantages of the Invention

According to the energy storage apparatus in the present invention, it is possible to suppress damage of the case of the energy storage device.

MODE FOR CARRYING OUT THE INVENTION

Figure 1:
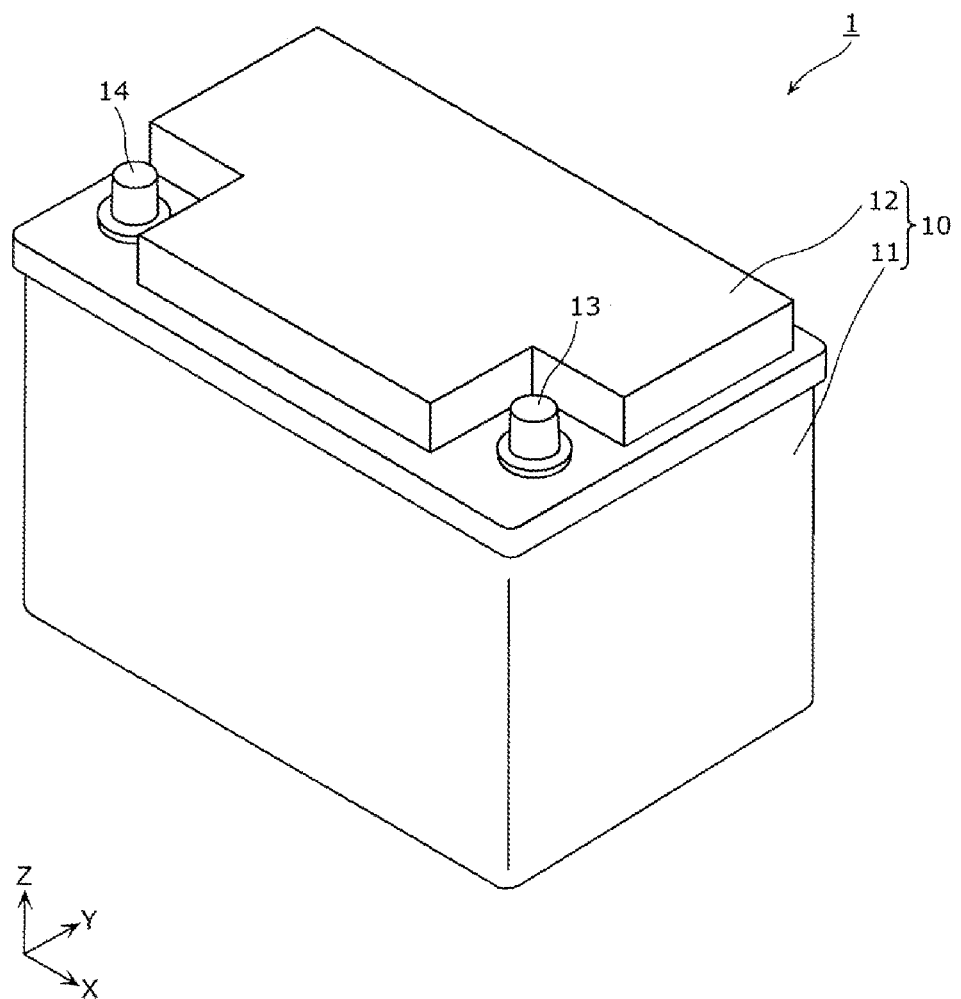
FIG. 1 is a perspective view showing an external appearance of an energy storage apparatus according to an embodiment.

In the energy storage apparatus having the above-mentioned conventional configuration, the case of the energy storage device may be damaged. In the energy storage apparatus disclosed in Patent Document 1, since the case (accommodating case) of the energy storage device is configured such that an opening portion of a case body is closed by a lid body, when the case is swollen due to the use of the energy storage device, stress is concentrated on a joining portion between the case body and the lid body, and the joining portion may be damaged.

According to one aspect of the present invention, there is provided an energy storage apparatus including: an energy storage device including a case in which a joining portion is formed; and a support member which is arranged so as to extend in an elongated shape along the joining portion at a position outside the case and along the joining portion in a side surface portion of the case, and supports the side surface portion.

With such a configuration, the energy storage apparatus includes the support member which extends in an elongated shape along the joining portion at a position outside the case of the energy storage device and along the joining portion in the side surface portion of the case, and supports the side surface portion. By arranging the support member at the position along the joining portion in the side surface portion of the case of the energy storage device in this manner, when the case is swollen, stress can be concentrated on a boundary portion between a portion supported by the support member and a portion not supported in the side surface portion. With such a configuration, it is possible to suppress concentration of stress on the joining portion of the case, and it is possible to suppress damage of the joining portion, so that it is possible to suppress damage of the case of the energy storage device.

The support member may be arranged so as to extend in the elongated shape along the joining portion in a state of mounting over the joining portion when viewed from a normal direction of the side surface portion.

With such a configuration, the support member extends in an elongated shape along the joining portion in a state of mounting over the joining portion. As described above, by arranging the support member so as to mount over the joining portion, the joining portion can be reinforced, and when the case is swollen, stress can be concentrated on the boundary portion between the portion supported by the support member and the portion not supported in the side surface portion. As a result, it is possible to suppress concentration of stress on the joining portion while reinforcing the joining portion, and it is thus possible to suppress damage of the joining portion.

The energy storage device may include an electrode assembly which is arranged inside the case and includes a flat portion formed at a position facing the side surface portion, an end edge of the support member in a direction from the joining portion toward the flat portion may be arranged between the joining portion and the flat portion when viewed from the normal direction of the side surface portion.

With such a configuration, the end edge of the support member in the direction from the joining portion toward the flat portion of the electrode assembly is arranged between the joining portion and the flat portion when viewed from the normal direction of the side surface portion of the case of the energy storage device. In the case of the energy storage device, a portion of the side surface portion which faces the flat portion of the electrode assembly is likely to be swollen. Accordingly, the end edge of the support member is arranged between the joining portion of the case of the energy storage device and the flat portion of the electrode assembly. As a result, since the boundary portion between the portion supported by the support member and the portion not supported in the side surface portion is arranged between the joining portion and the flat portion, stress can be concentrated between the joining portion and the flat portion when the case is swollen. If stress can be concentrated between the joining portion and the flat portion, it is possible to suppress concentration of stress on the joining portion, and it is possible to suppress damage of the joining portion, so that it is possible to suppress damage of the case of the energy storage device.

Further, the energy storage apparatus may further include a holding member which holds the support member, and the support member may have higher rigidity than the holding member.

With such a configuration, the support member is formed to have higher rigidity than the holding member which holds the support member. The side surface portion of the case of the energy storage device is supported by the support member having relatively high rigidity in this manner, so that the side surface portion can be firmly supported. If the side surface portion can be firmly supported by the support member, it is possible to suppress concentration of stress on the joining portion of the case when the case is swollen. With such a configuration, it is possible to suppress damage of the joining portion and hence, it is possible to suppress damage of the case of the energy storage device.

The support member may be a metal member, and the holding member may be a resin member formed integrally with the support member.

With such a configuration, the support member which is a metal member is formed integrally with the holding member which is a resin member. By forming the support member made of metal integrally with the holding member made of resin in this manner, the support member can be easily held by the holding member, the number of parts can be reduced, and the electrical insulation can be improved, so that the energy storage apparatus can be easily manufactured. With such a configuration, it is possible to easily realize a configuration which suppresses damage of the case of the energy storage device.

The support member may include: an extending portion facing the side surface portion and extending along the joining portion; and a protruding portion protruding from the extending portion in a direction intersecting the side surface portion.

With such a configuration, the support member includes the extending portion extending along the joining portion of the case of the energy storage device, and the protruding portion protruding from the extending portion. Since the support member can be reinforced by providing the protruding portion in the support member in this manner, the side surface portion of the case can be firmly supported by the support member having high strength. With such a configuration, when the case is swollen, it is possible to suppress concentration of stress on the joining portion of the case, and it is possible to suppress damage of the joining portion, so that it is possible to suppress damage of the case of the energy storage device.

The protruding portion may be arranged so as to extend along the joining portion.

With such a configuration, the protruding portion of the support member is arranged so as to extend along the joining portion of the case of the energy storage device. Since the protruding portion of the support member extends along the joining portion in this manner, the portion of the support member along the joining portion can be reinforced, and thus the position of the side surface portion of the case along the joining portion can be firmly supported. With such a configuration, when the case is swollen, concentration of stress on the joining portion of the case can be further suppressed, and damage of the joining portion can be further suppressed, so that damage of the case of the energy storage device can be further suppressed.

The energy storage apparatus may include a plurality of the energy storage devices, and the energy storage apparatus may include a first connecting member which extends along the plurality of energy storage devices in an arrangement direction of the plurality of energy storage devices and is connected to the support member.

With such a configuration, the first connecting member which extends along the plurality of energy storage devices and is connected to the support member is arranged. By connecting the first connecting member to the support member in this manner, the support member can be positioned at a predetermined position. The plurality of energy storage devices can be reinforced by the first connecting member.

The energy storage apparatus may include two support members which sandwich the plurality of energy storage devices in the arrangement direction, and each of the two support members may be connected to the first connecting member.

With such a configuration, each of the two support members which sandwich the plurality of energy storage devices in the arrangement direction thereof is connected to the first connecting member. By sandwiching the plurality of energy storage devices between the two support members in the arrangement direction thereof in this manner, even if the plurality of energy storage devices are to be swollen in the arrangement direction thereof, it is possible to suppress the swelling and hence, it is possible to suppress damage of the joining portions of the cases of the energy storage devices.

One end of each of the two support members may be connected to the first connecting member, and the energy storage apparatus may further include a second connecting member to which the other end of each of the two support members is connected.

With such a configuration, one ends of the two support members are connected to the first connecting member, and the other ends of the two support members are connected to the second connecting member. By connecting the two connecting members (the first connecting member and the second connecting member) to both ends of the two support members in this manner, the two support members and the two connecting members surround the periphery of the plurality of energy storage devices. With such a configuration, even if the plurality of energy storage devices are to be swollen, it is possible to more firmly suppress the swelling and hence, it is possible to further suppress damage of the joining portions of the cases of the energy storage devices.

Hereinafter, an energy storage apparatus according to an embodiment of the present invention (and a modification thereof) will be described with reference to the drawings. The embodiment described below describes a comprehensive or specific example. The numerical values, shapes, materials, components, positions for arranging the components and connection forms of the components, manufacturing steps, order of the manufacturing steps, and the like described in the following embodiment are merely examples, and are not intended to limit the present invention. Among the components in the following embodiment, components that are not described in the independent claim indicating the highest concept are described as optional components. In each drawing, dimensions and the like are not strictly illustrated.

In the following description and drawings, an arrangement direction of energy storage devices, an arrangement direction of spacers (intermediate spacers and end spacers), an arrangement direction of end plates, an opposing direction of long side surfaces of cases of the energy storage devices, or a thickness direction of the cases is defined as an X-axis direction. An arrangement direction of electrode terminals in one energy storage device, an opposing direction of short side surfaces of the cases of the energy storage devices, or an arrangement direction of side plates is defined as a Y-axis direction. An arrangement direction of an outer case body and a lid of the energy storage apparatus, an arrangement direction of a case body and a lid of the energy storage device, an arrangement direction of a bus bar frame and bus bars with respect to the energy storage device, or a vertical direction is defined as a Z-axis direction. The X-axis direction, the Y-axis direction, and the Z-axis direction are directions intersecting (in the present embodiment, orthogonal to) each other. Although the Z-axis direction may not be the vertical direction depending on the usage mode, the Z-axis direction will be described below as the vertical direction for convenience of description. In the following description, an X-axis plus direction indicates an arrow direction of the X axis, and an X-axis minus direction indicates a direction opposite to the X-axis plus direction. The same applies to the Y-axis direction and the Z-axis direction.

Embodiment

1. General Description of Energy Storage Apparatus 1

Figure 2:
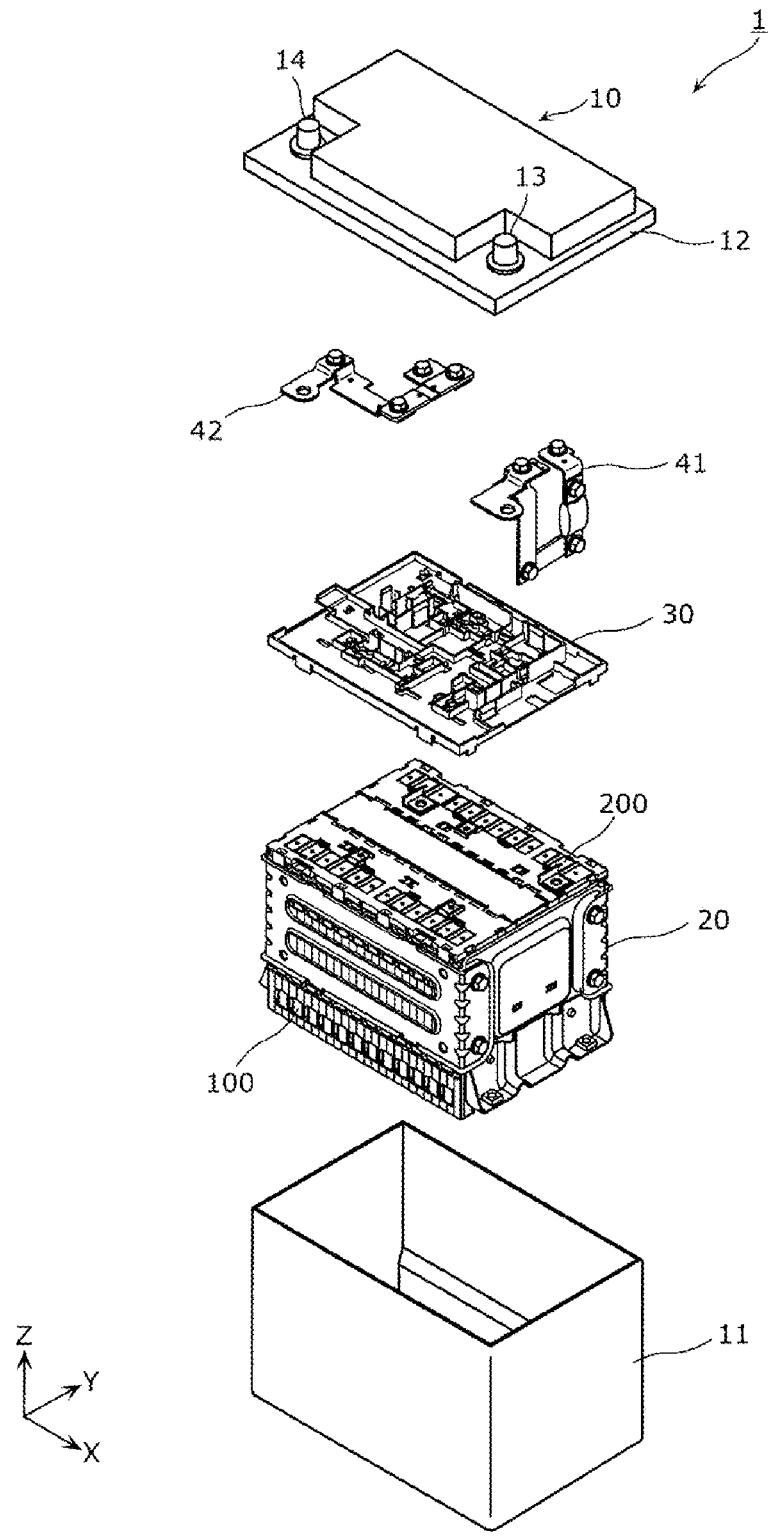
FIG. 2 is an exploded perspective view showing respective components when the energy storage apparatus according to the embodiment is disassembled.
Figure 3:
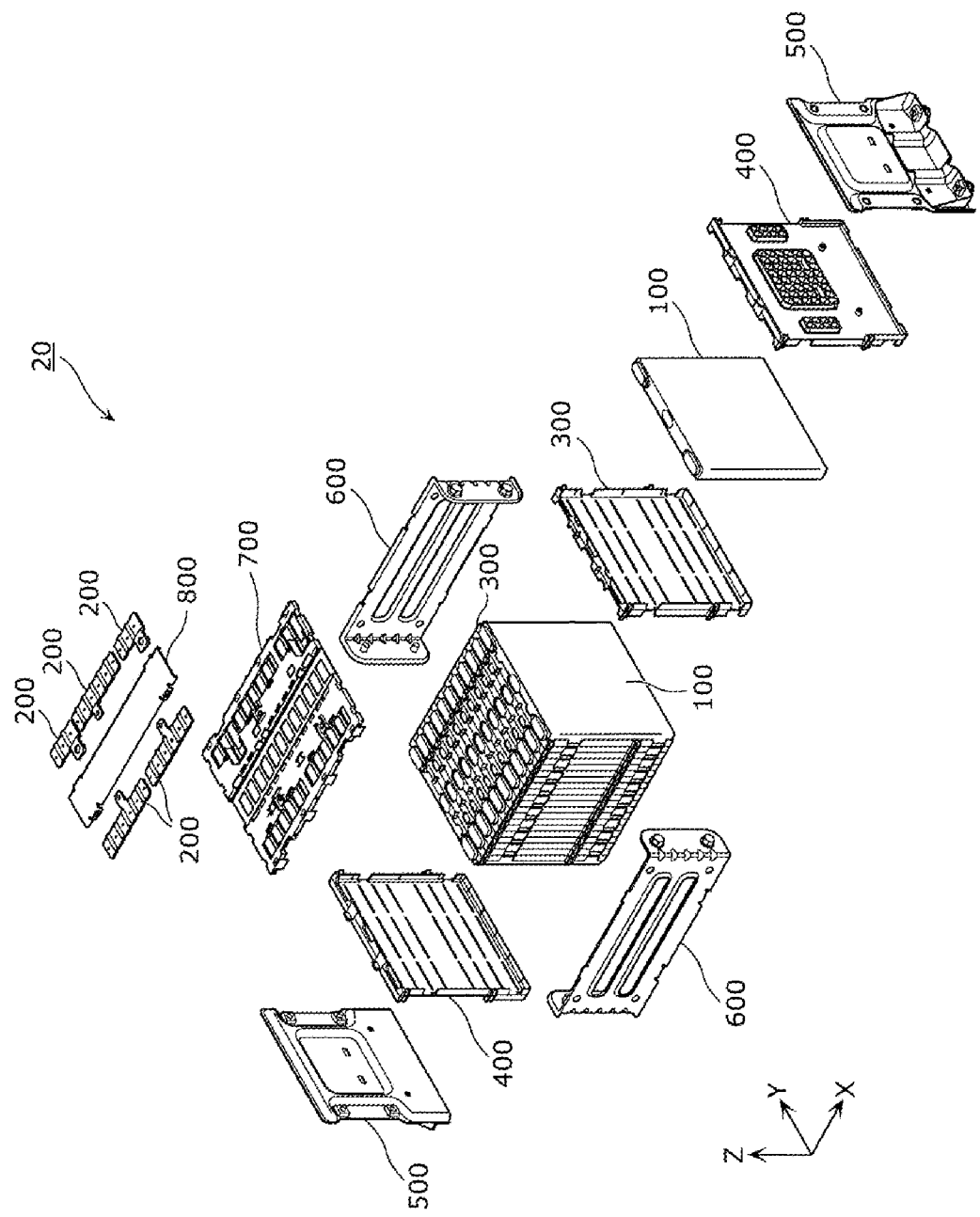
FIG. 3 is an exploded perspective view showing respective components when an energy storage unit according to the embodiment is disassembled.

First, an energy storage apparatus 1 in the present embodiment will be generally described with reference to FIGS. 1 to 3. FIG. 1 is a perspective view showing an external appearance of the energy storage apparatus 1 according to the present embodiment. FIG. 2 is an exploded perspective view showing respective components when the energy storage apparatus 1 according to the present embodiment is disassembled. FIG. 3 is an exploded perspective view showing respective components when an energy storage unit 20 according to the present embodiment is disassembled.

The energy storage apparatus 1 is an apparatus capable of being charged with electricity from the outside and discharging electricity to the outside, and has a substantially rectangular parallelepiped shape in the present embodiment. For example, the energy storage apparatus 1 is a battery module (assembled battery) used for power storage applications, power supply applications, and the like. Specifically, the energy storage apparatus 1 is used as a battery for driving or starting an engine of a moving body such as an automobile such as an electric vehicle (EV), a hybrid electric vehicle (HEV), or a plug-in hybrid electric vehicle (PHEV), a motorcycle, a watercraft, a snowmobile, an agricultural machine, a construction machine, or a railway vehicle for an electric railway such as a train, a monorail, or a linear motor car.

As shown in FIG. 1, the energy storage apparatus 1 includes an outer case 10, and as shown in FIG. 2, the energy storage unit 20 including energy storage devices 100 and the like, an electric component tray 30, bus bars 41 and 42, and the like are accommodated in the outer case 10.

The outer case 10 is a case (module case) having a box shape (substantially rectangular parallelepiped shape) which forms an outer case of the energy storage apparatus 1. That is, the outer case 10 is arranged outside the energy storage unit 20, the electric component tray 30, the bus bars 41 and 42, and the like, and arranges the energy storage unit 20 and the like at predetermined positions to protect them from an impact or the like. The outer case 10 is made of an electrically insulating resin material such as polycarbonate (PC), polypropylene (PP), polyethylene (PE), polyphenylene sulfide resin (PPS), polyethylene terephthalate (PET), polyether ether ketone (PEEK), tetrafluoroethylene-perfluoroalkyl vinyl ether (PFA), polytetrafluoroethylene (PTFE), polybutylene terephthalate (PBT), polyether sulfone (PES), ABS resin, or a composite material thereof. With such a configuration, the outer case 10 prevents the energy storage unit 20 and the like from coming into contact with an external metal member or the like.

The outer case 10 includes an outer case body 11 which forms a body of the outer case 10 and an outer case lid body 12 which forms a lid body of the outer case 10. The outer case body 11 is a bottomed rectangular cylindrical housing (casing) in which an opening is formed, and accommodates the energy storage unit 20 and the like. The outer case lid body 12 is a flat rectangular member which closes the opening of the outer case body 11, and is provided with a positive electrode external terminal 13 and a negative electrode external terminal 14. The energy storage apparatus 1 is charged with electricity from the outside and discharges electricity to the outside through the positive electrode external terminal 13 and the negative electrode external terminal 14. The outer case body 11 and the outer case lid body 12 may be formed of members made of the same material, or may be formed of members made of different materials.

The energy storage unit 20 includes the plurality of energy storage devices 100, bus bars 200, and the like, and is electrically connected to the positive electrode external terminal 13 and the negative electrode external terminal 14 provided on the outer case lid body 12 through the bus bars 41 and 42. The energy storage units 20 are arranged in the X-axis direction in a state where the plurality of energy storage devices 100 are placed in a vertical state, and are arranged inside the outer case body 11. The energy storage unit 20 is accommodated inside the outer case 10 by being covered with the outer case lid body 12 from above. The detailed configuration of the energy storage unit 20 will be described later.

The electric component tray 30 is a member that can hold electric components such as the bus bars 41 and 42 and other relays, a circuit board, and wirings (not shown), electrically insulate the bus bars 41 and 42 and the like from other members, and regulate the positions of the bus bars 41 and 42 and the like. The electric component tray 30 is made of an insulating resin material such as PC, PP, PE, PPS, PET, PEEK, PFA, PTFE, PBT, PES, ABS resin, or a composite material thereof. The bus bars 41 and 42 are conductive members which electrically connect the bus bars 200 in the energy storage unit 20 to the positive electrode external terminal 13 and the negative electrode external terminal 14 provided on the outer case lid body 12. The bus bars 41 and 42 are made of aluminum, an aluminum alloy, copper, a copper alloy, or the like.

Next, a configuration of the energy storage unit 20 will be described in detail. As shown in FIG. 3, the energy storage unit 20 includes the plurality of energy storage devices 100, the plurality of bus bars 200, a plurality of intermediate spacers 300, a pair of end spacers 400, a pair of end plates 500, a pair of side plates 600, a bus bar frame 700, and a heat shielding plate 800.

The energy storage device 100 is a secondary battery (battery cell) capable of being charged with electricity and discharging electricity, and more specifically, is a nonaqueous electrolyte secondary battery such as a lithium ion secondary battery. The energy storage device 100 has a flat rectangular parallelepiped (prismatic) shape, and in the present embodiment, the twelve energy storage devices 100 are arranged side by side in the X-axis direction. The shape of the energy storage device 100 and the number of the energy storage devices 100 arranged are not limited. The energy storage device 100 is not limited to the nonaqueous electrolyte secondary battery, and may be a secondary battery other than the nonaqueous electrolyte secondary battery, or may be a capacitor. The energy storage device 100 may be a laminate-type energy storage device. The configuration of the energy storage device 100 will be described in detail later.

The bus bar 200 is a rectangular flat-plate-like member which is arranged above the plurality of energy storage devices 100 and electrically connects electrode terminals of the plurality of energy storage devices 100 to each other. The bus bar 200 is formed of a conductive member made of metal such as aluminum, an aluminum alloy, copper, or a copper alloy. In the present embodiment, the bus bars 200 form four sets of energy storage device groups by connecting three energy storage devices 100 in parallel, and connect the four sets of energy storage device groups in series. The bus bars 200 connect positive electrode terminals of the three energy storage devices 100 in the energy storage device group arranged on the positive electrode external terminal 13 side (X-axis plus direction side) and the bus bar 41. Further, the bus bars 200 connect negative electrode terminals of the three energy storage devices 100 in the energy storage device group arranged on the negative electrode external terminal 14 side (X-axis minus direction side) and the bus bar 42. The bus bars 200 may connect all of the twelve energy storage devices 100 in series, or may have other configurations.

The intermediate spacer 300 and the end spacer 400 are each a spacer which is arranged on the side (the X-axis plus direction or the X-axis minus direction) of the energy storage device 100, electrically insulates the energy storage device 100 from other members, and suppresses swelling of the energy storage device 100. The intermediate spacer 300 and the end spacer 400 (excluding a support member 50 described later) are made of an insulating resin material such as PC, PP, PE, PPS, PET, PEEK, PFA, PTFE, PBT, PES, ABS resin, or a composite material thereof. The intermediate spacer 300 and the end spacer 400 may be made of a material other than resin as long as they have insulation, or may be made of a ceramic, a mica plate formed of a dammar material formed by accumulating and bonding mica pieces, or the like. All of the plurality of intermediate spacers 300 and the pair of end spacers 400 may not be formed of the same material.

The intermediate spacer 300 is a rectangular flat-plate-like spacer which is arranged to be sandwiched between two energy storage devices 100 adjacent to each other and electrically insulates the two energy storage devices 100 from each other. In the present embodiment, the twelve energy storage devices 100 are arranged alternately adjacent to the eleven intermediate spacers 300 and are arranged in the X-axis direction, but when the number of energy storage devices 100 is other than twelve, the number of intermediate spacers 300 is also changed according to the number of energy storage devices 100.

The end spacer 400 is a rectangular flat-plate-like spacer which is arranged to be sandwiched between the energy storage device 100 at an end portion of the plurality of energy storage devices 100 and the end plate 500 and electrically insulates the energy storage device 100 and the end plate 500 from each other. The configuration of the end spacer 400 will be described in detail later.

The end plates 500 and the side plates 600 are members which press the energy storage devices 100 from the outside in the arrangement direction of the plurality of energy storage devices 100 (X-axis direction). That is, the end plates 500 and the side plates 600 press the respective energy storage devices 100 included in the plurality of energy storage devices 100 from both sides in the arrangement direction by sandwiching the plurality of energy storage devices 100 from both sides in the arrangement direction. That is, in the present embodiment, the energy storage apparatus 1 is a compression-type (pressure-restraint system) energy storage apparatus.

The end plates 500 are rectangular flat-plate-like sandwiching members which are arranged on both sides of the plurality of energy storage devices 100 in the X-axis direction and sandwich and hold the plurality of energy storage devices 100 from both sides in the arrangement direction (X-axis direction) of the plurality of energy storage devices 100. The end plate 500 is made of a metal material such as stainless steel, iron, a plated steel plate, aluminum, or an aluminum alloy from the viewpoint of securing strength and the like. A material of the end plate 500 is not particularly limited, and the end plate 500 may be made of, for example, an electrically insulating material having high strength, or may be subjected to an insulation treatment. The end plate 500 may have a block shape or the like instead of a plate shape.

The side plate 600 is an elongated plate-like restraining member (restraining bar) which has both ends thereof attached to the end plates 500 and restrains the plurality of energy storage devices 100. That is, the side plate 600 is arranged so as to extend in the X-axis direction and extend over the plurality of energy storage devices 100, the plurality of intermediate spacers 300, and the pair of end spacers 400, and applies a restraining force in the arrangement direction (X-axis direction) to the plurality of energy storage devices 100 and the like. In the present embodiment, the two side plates 600 are arranged on both sides of the plurality of energy storage devices 100 in the Y-axis direction. With such a configuration, the two side plates 600 sandwich and restrain the plurality of energy storage devices 100 and the like from both sides in the X-axis direction and both sides in the Y-axis direction respectively. The side plate 600 may be made of any material, but is made of the same material as that of the end plate 500 from the viewpoint of securing strength and the like. The side plate 600 may be a block-shaped member or a rod-shaped member instead of a plate-like member.

The bus bar frame 700 is a rectangular flat-plate-like member that electrically insulates the bus bars 200 from other members and regulates the positions of the bus bars 200. Specifically, the bus bars 200 are placed on the bus bar frame 700 and positioned, and the bus bar frame 700 is placed on the plurality of energy storage devices 100 and positioned with respect to the plurality of energy storage devices 100. With such a configuration, the bus bars 200 are positioned with respect to the plurality of energy storage devices 100. The bus bar frame 700 is made of an insulating resin material such as PC, PP, PE, PPS, PET, PEEK, PFA, PTFE, PBT, PES, ABS resin, or a composite material thereof. The heat shielding plate 800 is a plate-like member having a heat insulating property and arranged in a flow path of exhaust gas from gas release valves of the energy storage devices 100, and is placed on the bus bar frame 700.

2 Description of Configuration of Energy Storage Device 100

Figure 4:
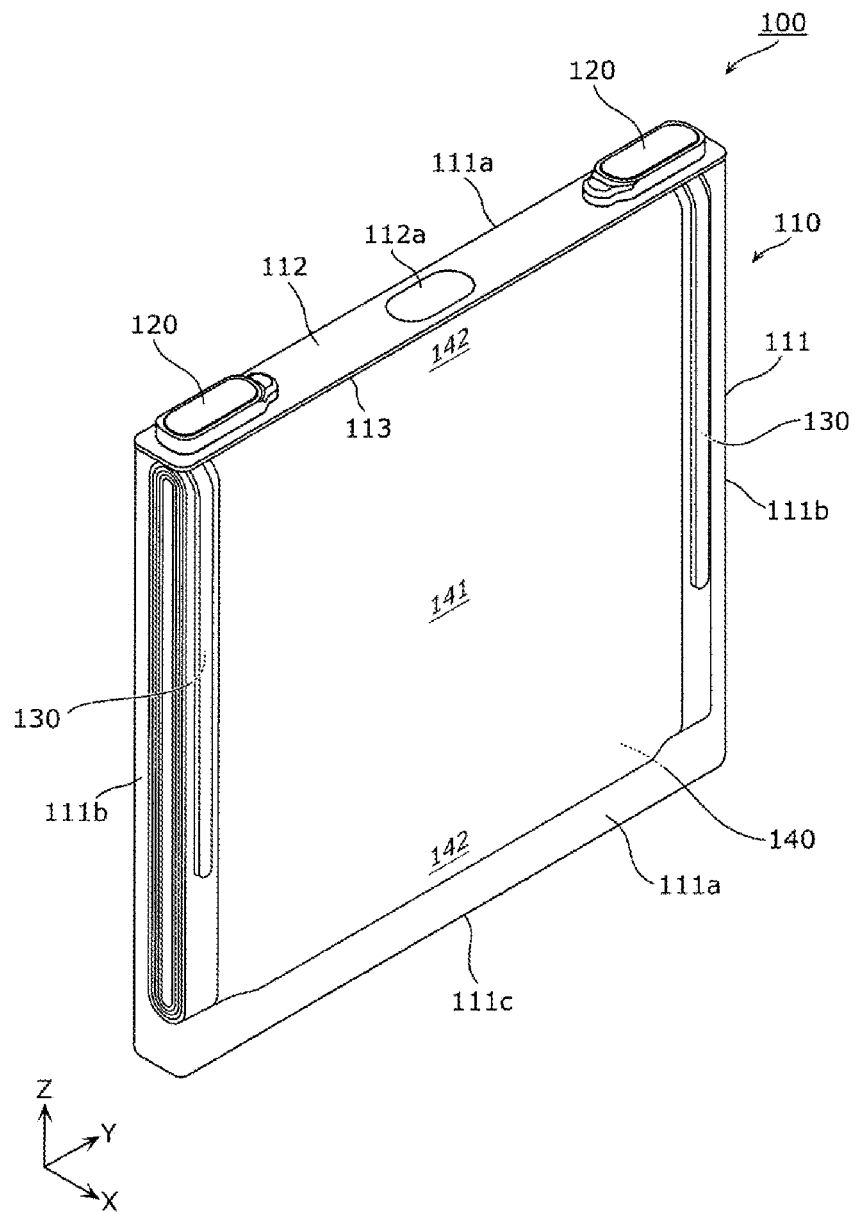
FIG. 4 is a perspective view showing a configuration of an energy storage device according to the embodiment.

Next, a configuration of the energy storage device 100 will be described in detail. FIG. 4 is a perspective view showing the configuration of the energy storage device 100 according to the present embodiment. Specifically, FIG. 4 also shows the inside of the energy storage device 100 in a perspective view of a case 110 of the energy storage device 100. All the energy storage devices 100 included in the energy storage unit 20 have the configuration shown in FIG. 4.

As shown in FIG. 4, the energy storage device 100 includes the case 110 and two electrode terminals 120 (a positive electrode terminal and a negative electrode terminal). Two current collectors 130 (a positive electrode current collector and a negative electrode current collector) and an electrode assembly 140 are arranged in the case 110. Although an electrolyte solution (nonaqueous electrolyte) is also sealed in the case 110, the illustration is omitted. Although gaskets are arranged between the electrode terminal 120 and the case 110 and between the current collector 130 and the case 110, detailed description thereof is omitted. Furthermore, in addition to the above-described components, a spacer arranged between the electrode assembly 140 and the case 110, an insulating sheet covering the electrode assembly 140, and the like may be arranged.

The case 110 is a substantially rectangular parallelepiped (prismatic) case including a case body 111 in which an opening is formed and a case lid body 112 that closes the opening of the case body 111. The case body 111 is a member having a rectangular cylindrical shape and a bottom and constituting a body portion of the case 110, and includes two long side surface portions 111a on side surfaces on both sides in the X-axis direction, two short side surface portions 111b on side surfaces on both sides in the Y-axis direction, and a bottom surface portion 111c on the Z-axis minus direction side. The long side surface portion 111a is a rectangular flat-plate-like wall portion forming the long side surface of the case 110, and is arranged adjacent to the case lid body 112. The short side surface portion 111b is a rectangular flat-plate-like wall portion forming the short side surface of the case 110, and is arranged adjacent to the case lid body 112. That is, the short side surface portion 111b is formed to have an outer surface area smaller than that of the long side surface portion 111a. The bottom surface portion 111c is a rectangular flat-plate-like wall portion forming the bottom surface of the case 110. The case lid body 112 is a rectangular flat-plate-like wall portion which is arranged on the Z-axis plus direction side of the case body 111 and constitutes a lid portion of the case 110, and is provided with the two electrode terminals 120.

Specifically, the case 110 has a configuration in which the electrode assembly 140 and the like are accommodated inside the case body 111, and then the case body 111 and case lid body 112 are joined to each other by welding or the like to form a joining portion 113, so that the inside is sealed. That is, on the side surfaces (surfaces on both sides in the X-axis direction and on both sides in the Y-axis direction) of the case 110, the joining portion 113 where the case body 111 and the case lid body 112 are joined to each other is formed. The material of the case 110 (the case body 111 and the case lid body 112) is not particularly limited, but is preferably weldable (joinable) metal such as stainless steel, aluminum, an aluminum alloy, iron, or a plated steel plate. The case lid body 112 is provided with a gas release valve 112a which releases the pressure when the pressure inside the case 110 increases, an electrolyte solution filling portion (not shown) which fills an electrolyte solution, and the like, but detailed description thereof is omitted.

The electrode terminals 120 are terminals (the positive electrode terminal and the negative electrode terminal) electrically connected to a positive electrode plate and a negative electrode plate of the electrode assembly 140 through the current collectors 130. That is, the electrode terminal 120 is a metal member for leading out electricity stored in the electrode assembly 140 to a space outside the energy storage device 100 and introducing electricity into a space inside the energy storage device 100 to store electricity in the electrode assembly 140. The electrode terminal 120 is made of aluminum, an aluminum alloy, copper, a copper alloy, or the like.

The electrode assembly 140 is an energy storage element (power generating element) which can store electricity, includes the positive electrode plate, the negative electrode plate, and a separator, and is formed by laminating the positive electrode plate, the negative electrode plate, and the separator in the X-axis direction. To be more specific, the electrode assembly 140 is a winding-type electrode assembly formed by winding the positive electrode plate, the negative electrode plate, and the separator around a winding axis (a virtual axis in the Y-axis direction penetrating the center of the electrode assembly 140), and is electrically connected to the current collectors 130. The positive electrode plate is an electrode plate in which a positive active material layer is formed on a surface of a positive electrode substrate layer which is an elongated strip-shaped metal foil made of aluminum, an aluminum alloy, or the like. The negative electrode plate is an electrode plate in which a negative active material layer is formed on a surface of a negative electrode substrate layer which is an elongated strip-shaped metal foil made of copper, a copper alloy, or the like. The separator is a microporous sheet made of resin. As the positive active material and the negative active material used for the positive active material layer and the negative active material layer, known materials can be appropriately used as long as they are active materials which can occlude and discharge lithium ions. As the separator, a known material can be appropriately used as long as the performance of the energy storage device 100 is not impaired.

Since the electrode assembly 140 has an elliptical shape as viewed from the winding-axis direction, a pair of straight line portions of the elliptical shape which face each other are referred to as flat portions 141, and a pair of curved line portions which face each other are referred to as curved portions 142. That is, the flat portions 141 and the curved portions 142 are portions formed by winding the positive electrode plate, the negative electrode plate, and the separator in an elliptical shape. The flat portions 141 and the curved portions 142 are portions arranged in a region where the active material of the positive electrode plate or the negative electrode plate is formed.

Specifically, the flat portions 141 are portions having a flat shape connecting the pair of curved portions 142, and are arranged on both sides of the electrode assembly 140 in the X-axis direction. That is, the flat portions 141 are regions (specifically, abutting regions) facing the long side surface portions 111a of the case 110 in a state where the electrode assembly 140 is arranged in the case 110, and are regions to which pressure is applied by swelling of the electrode assembly 140. When an insulating sheet is arranged between the electrode assembly 140 and the case 110, the flat portions 141 do not directly abut on the case 110 but indirectly abut thereon. In a state where the electrode assembly 140 is taken out from the case 110, the flat portions 141 are also portions which become flat when the electrode assembly 140 is pressed in the X-axis direction. The curved portions 142 are substantially U-shaped portions having a curved shape connecting the pair of flat portions 141 as viewed from the winding-axis direction, and are arranged on both sides of the electrode assembly 140 in the Z-axis direction.

The current collectors 130 are members (the positive electrode current collector and the negative electrode current collector) having conductivity and rigidity, which are arranged between the electrode assembly 140 and the side wall of the case 110, and electrically connected to the electrode terminals 120 and the electrode assembly 140. To be more specific, the current collectors 130 are joined to end portions of the electrode assembly 140 in the Y-axis direction by welding or the like. The current collector 130 on the positive electrode side is formed of aluminum, an aluminum alloy, or the like similarly to the positive electrode substrate layer of the positive electrode plate, and the current collector 130 on the negative electrode side is formed of copper, a copper alloy, or the like similarly to the negative electrode substrate layer of the negative electrode plate.

3 Description of Configuration of End Spacer 400

Figure 5:
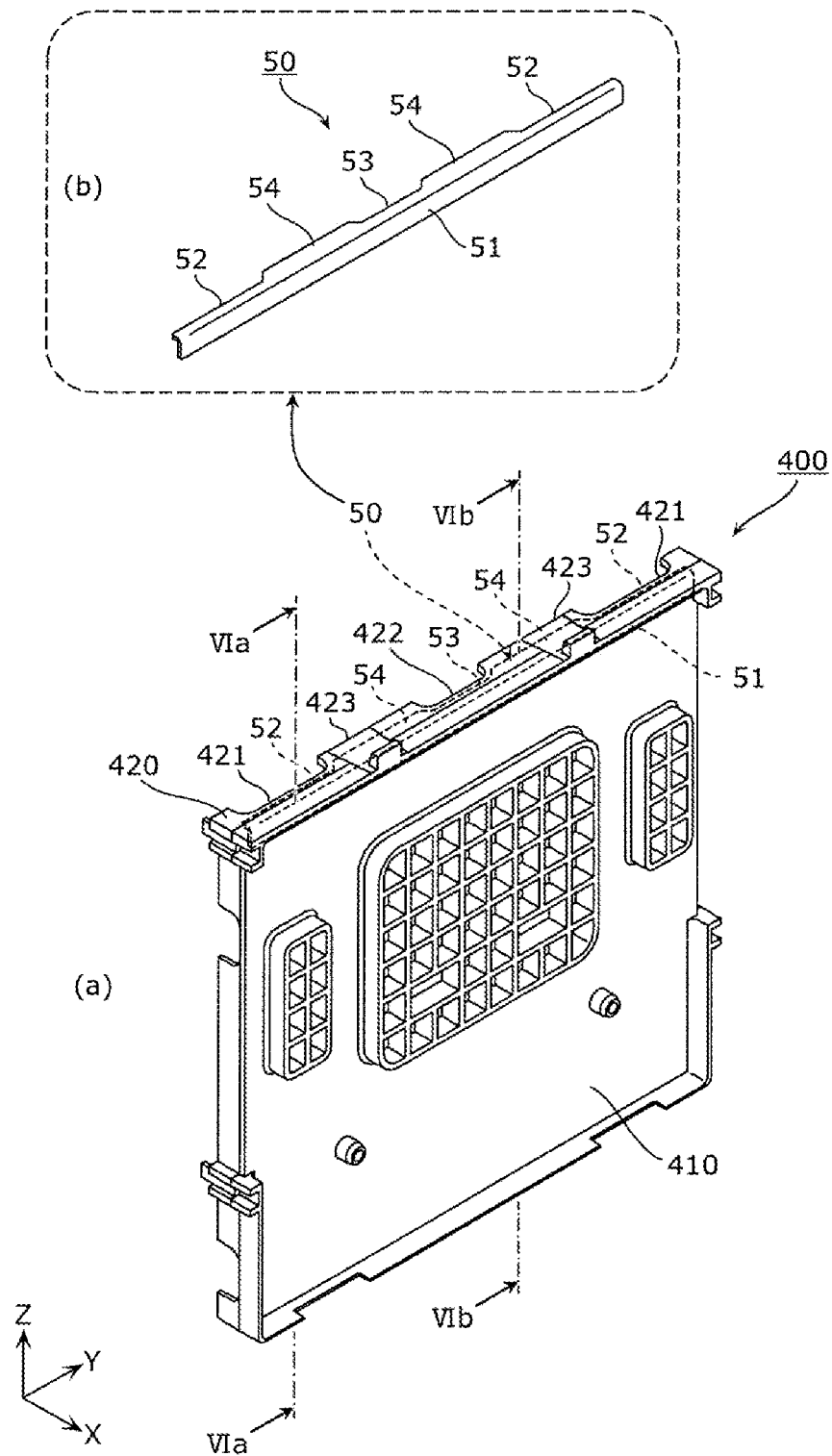
FIG. 5 is a perspective view showing a configuration of an end spacer according to the embodiment.
Figure 6:
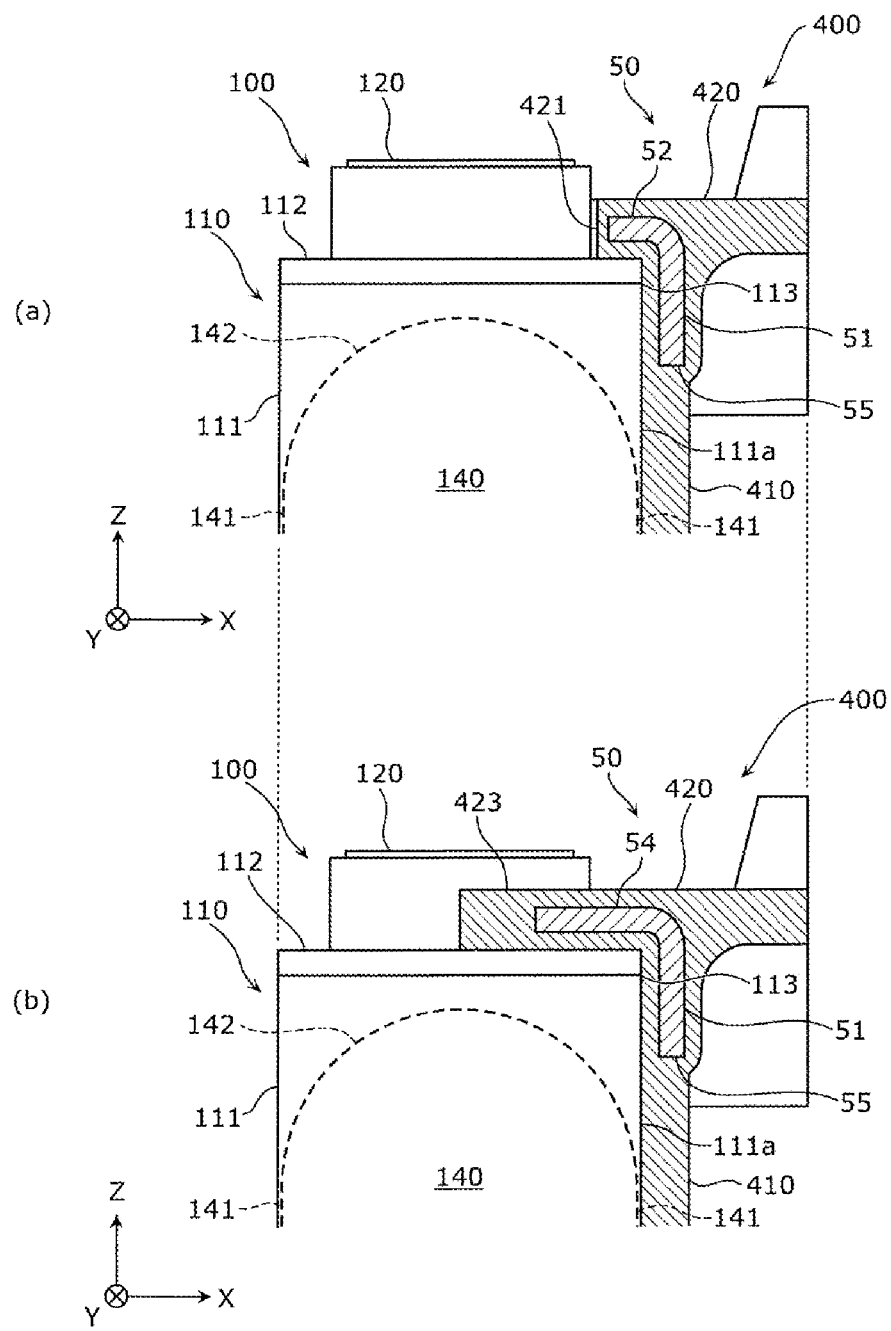
FIG. 6 is a cross-sectional view showing the configuration of the end spacer according to the embodiment.

Next, a configuration of the end spacer 400 will be described in detail. FIG. 5 is a perspective view showing the configuration of the end spacer 400 according to the present embodiment. Specifically, the part (a) of FIG. 5 is a perspective view showing the configuration of the end spacer 400 on the X-axis plus direction side in FIG. 3, and the part (b) of FIG. 5 is a perspective view showing a configuration of the support member 50 included in the end spacer 400. FIG. 6 is a cross-sectional view showing the configuration of the end spacer 400 according to the present embodiment. Specifically, the part (a) of FIG. 6 shows a configuration when cut along a VIa-VIa cross section in the part (a) of FIG. 5, and the part (b) of FIG. 6 shows a configuration when cut along a VIb-VIb cross section in the part (a) of FIG. 5. In FIG. 6, the positional relationship between the energy storage device 100 and the end spacer 400 and the support member 50 is also illustrated by also illustrating the energy storage device 100. In FIG. 3, since the end spacers 400 on the X-axis plus direction side and the X-axis minus direction side have the same shape, the description of the end spacer 400 on the X-axis minus direction side is omitted.

First, as shown in FIG. 5, the end spacer 400 includes a spacer body portion 410, a spacer end portion 420, and the support member 50. The spacer body portion 410 is a rectangular flat-plate-like portion which forms a body of the end spacer 400, and is arranged so as to face the long side surface portion 111a of the energy storage device 100 at an end portion. The spacer end portion 420 is an elongated portion which is arranged at an end portion of the end spacer 400 on the Z-axis plus direction side and extends in the Y-axis direction. The support member 50 is a plate-like portion which is arranged inside the spacer end portion 420, extends in the Y-axis direction, and has an L-shaped cross section.

As described above, the spacer body portion 410 and the spacer end portion 420 are formed of an electrically insulating member such as resin. The support member 50 is formed of a metal member such as stainless steel, aluminum, an aluminum alloy, iron, or a plated steel plate. Therefore, the support member 50 has higher rigidity than the spacer body portion 410 and the spacer end portion 420. High rigidity refers to a state of being strong against an external force, and can be defined as a state in which a dimensional change is small against a bending or twisting force. That is, the support member 50 having higher rigidity than the spacer end portion 420 means that the dimensional change (deflection amount) of the support member 50 is smaller when the support member 50 and the spacer end portion 420 are pressed with the same force at the central portions of the regions having the same size. It can also be said that the force required for causing the same dimensional change is larger in the support member 50 than in the spacer end portion 420. The definition of the rigidity is not limited to the above, and may be a definition within a range that can be usually interpreted by those skilled in the art.

The support member 50 is integrated with the spacer end portion 420 (and the spacer body portion 410). That is, the spacer end portion 420 (and the spacer body portion 410) is formed integrally with the support member 50 by, for example, insert molding. Specifically, resin is injected into a mold in which the support member 50 is arranged to form an integrally molded product including the support member 50 and the spacer end portion 420 (and the spacer body portion 410). As a result, the spacer end portion 420 is arranged so as to cover the periphery of the support member 50, and the electrical insulation is secured. As described above, the spacer end portion 420 (and the spacer body portion 410) is a portion for holding the support member 50, and is an example of a holding member.

A pair of first spacer recessed portions 421 and a second spacer recessed portion 422 which are recessed in the X-axis plus direction are formed at a portion of a distal end portion of the spacer end portion 420 on the Z-axis plus direction side which protrudes in the X-axis minus direction. The pair of first spacer recessed portions 421 are recessed portions which extend in the Y-axis direction and are formed at both end portions of the spacer end portion 420 in the Y-axis direction at positions where the pair of electrode terminals 120 are arranged in order to avoid interference with the pair of electrode terminals 120 included in the energy storage device 100 (see the part (a) of FIG. 6). The second spacer recessed portion 422 is a recessed portion which extends in the Y-axis direction and is formed at a position where the gas release valve 112a is arranged at the center portion of the spacer end portion 420 in the Y-axis direction in order to avoid interference with the gas release valve 112a included in the energy storage device 100. With such a configuration, a pair of spacer protruding portions 423 which protrude in the X-axis minus direction and extend in the Y-axis direction are formed between the pair of first spacer recessed portions 421 and the second spacer recessed portion 422 (see the part (b) of FIG. 6).

The support member 50 includes an extending portion 51 extending in the Y-axis direction, and a pair of first support protruding portions 52, a second support protruding portion 53, and a pair of third support protruding portions 54 protruding in the X-axis minus direction from the extending portion 51. The extending portion 51 is an elongated flat-plate-like portion parallel to the YZ plane which extends in the Y-axis direction from an end portion of the spacer end portion 420 on the Y-axis minus direction side to an end portion thereof on the Y-axis plus direction side. The pair of first support protruding portions 52 are elongated portions which protrude in the X-axis minus direction from both end portions in the Y-axis direction of the end portion of the extending portion 51 on the Z-axis plus direction side and extend in the Y-axis direction. The second support protruding portion 53 is an elongated portion which protrudes in the X-axis minus direction from a center portion in the Y-axis direction of the end portion of the extending portion 51 on the Z-axis plus direction side and extends in the Y-axis direction. The pair of third support protruding portions 54 are elongated flat-plate-like portions which are arranged between the pair of first support protruding portions 52 and the second support protruding portion 53, protrude toward the X-axis minus direction side from the pair of first support protruding portions 52 and the second support protruding portion 53, and extend in the Y-axis direction.

The pair of first support protruding portions 52 are arranged at positions corresponding to the pair of first spacer recessed portions 421 of the spacer end portion 420 (see the part (a) of FIG. 6). The second support protruding portion 53 is arranged at a position corresponding to the second spacer recessed portion 422 of the spacer end portion 420. The pair of third support protruding portions 54 are arranged inside the pair of spacer protruding portions 423 of the spacer end portion 420 (see the part (b) of FIG. 6). In the present embodiment, in the energy storage device 100, since the electrode terminal 120 has a larger width in the X-axis direction than the gas release valve 112a, the first spacer recessed portion 421 is formed to have a larger recessed amount in the X-axis plus direction than the second spacer recessed portion 422. Therefore, the first support protruding portion 52 is formed to have a smaller protruding amount in the X-axis minus direction than the second support protruding portion 53.

In the above-mentioned configuration, as shown in FIG. 6, the support member 50 is arranged so as to extend in an elongated shape along the joining portion 113 at a position outside the case 110 of the energy storage device 100 and along the joining portion 113 in the long side surface portion 111a of the case 110 together with the spacer end portion 420. Specifically, the support member 50 is arranged so as to extend in an elongated shape along the joining portion 113 in a state of mounting over the joining portion 113 when viewed from the normal direction (X-axis direction) of the long side surface portion 111a of the case 110. That is, the support member 50 is formed to be longer in the Y-axis direction than in the X-axis direction and the Z-axis direction, and is arranged so as to cover the joining portion 113 extending in the Y-axis direction. As a result, the support member 50 indirectly abuts on the long side surface portion 111a through the spacer end portion 420, presses the long side surface portion 111a, and supports the long side surface portion 111a.

Specifically, in the support member 50, the extending portion 51 is arranged at a position facing the long side surface portion 111a (on the X-axis plus direction side of the long side surface portion 111a), and is arranged so as to extend in the Y-axis direction along the joining portion 113. More specifically, the extending portion 51 is arranged such that an extending portion end edge 55 is located on the Z-axis minus direction side with respect to the joining portion 113 as viewed in the normal direction (X-axis direction) of the long side surface portion 111a. The extending portion end edge 55 is an end edge of the extending portion 51 in a direction from the joining portion 113 toward the flat portion 141 of the electrode assembly 140 of the energy storage device 100 (Z-axis minus direction). In the present embodiment, the extending portion end edge 55 is arranged between the joining portion 113 and the flat portion 141 as viewed from the X-axis direction. Specifically, the extending portion end edge 55 is arranged at a substantially central position between the joining portion 113 and the end edge of the flat portion 141 on the Z-axis plus direction side and at a position facing the curved portion 142 of the electrode assembly 140, as viewed from the X-axis direction. As described above, the extending portion 51 is arranged outside the flat portion 141 of the electrode assembly 140 as viewed from the X-axis direction.

The pair of first support protruding portions 52, the second support protruding portion 53, and the pair of third support protruding portions 54 protrude from the extending portion 51 in the direction intersecting the long side surface portion 111a (X-axis minus direction), and are arranged so as to extend in the Y-axis direction along the joining portion 113. To be more specific, the first support protruding portions 52 and the first spacer recessed portions 421 are arranged on the X-axis plus direction side of the electrode terminals 120 of the energy storage device 100. The second support protruding portion 53 and the second spacer recessed portion 422 are arranged on the X-axis plus direction side of the gas release valve 112a of the energy storage device 100. The third support protruding portions 54 and the spacer protruding portions 423 are arranged between the electrode terminals 120 and the gas release valve 112a.

As described above, the support member 50 and the spacer end portion 420 are arranged on the end portion of the case 110 of the energy storage device 100 on the X-axis plus direction side and the Z-axis plus direction side (that is, a corner portion on the X-axis plus direction side and the Z-axis plus direction side) so as to extend in the Y-axis direction. In the present embodiment, the spacer end portion 420 is arranged in abutment against the end portion of the case 110 on the X-axis plus direction side and the Z-axis plus direction side, but may be arranged away from at least a part of the end portion. However, in a case where the spacer end portion 420 is arranged away from the end portion of the long side surface portion 111a of the case 110 on the Z-axis plus direction side, the spacer end portion 420 is arranged at a position where the spacer end portion 420 abuts on the end portion when the case 110 is swollen. Accordingly, when the case 110 is swollen, the support member 50 indirectly abuts on the long side surface portion 111a to support the long side surface portion 111a.

4 Description of Effects

As described above, the energy storage apparatus 1 according to the embodiment of the present invention includes the support member 50 which extends in an elongated shape along the joining portion 113 at a position outside the case 110 of the energy storage device 100 and along the joining portion 113 in the long side surface portion 111a of the case 110, and supports the long side surface portion 111a. By arranging the support member 50 at the position along the joining portion 113 in the long side surface portion 111a in this manner, when the case 110 is swollen, stress can be concentrated on the boundary portion (portion corresponding to the extending portion end edge 55) between the portion supported by the support member 50 and the portion not supported in the long side surface portion 111a. This makes it possible to suppress concentration of stress on the joining portion 113 of the case 110.

Figure 7:
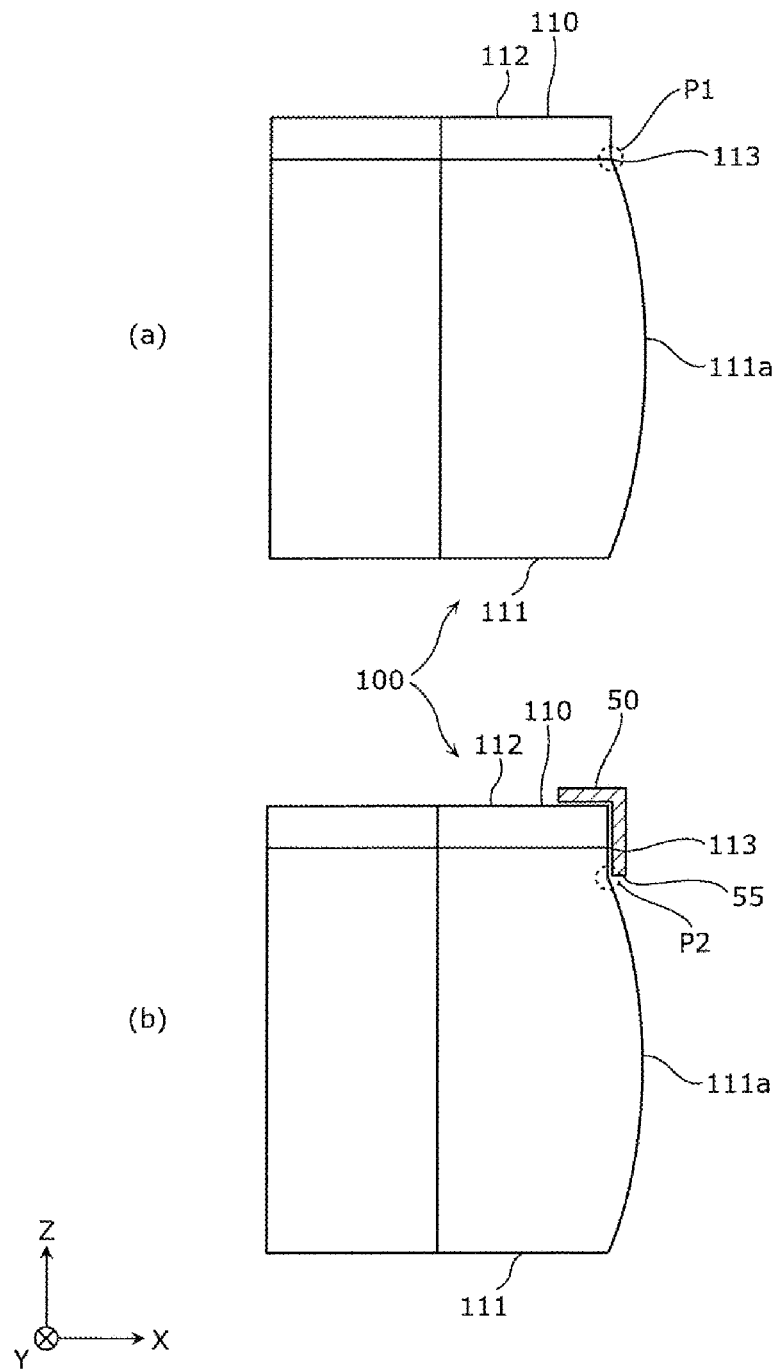
FIG. 7 is a view for explaining an effect obtained by the energy storage apparatus according to the embodiment.

Specifically, as shown in the part (a) of FIG. 7, when the support member 50 is not arranged on the energy storage device 100, the long side surface portion 111a is swollen starting from the position (the position of the point P1) of the joining portion 113 between the case body 111 of the case 110 and the case lid body 112, so that stress is concentrated on the joining portion 113. On the other hand, as shown in the part (b) of FIG. 7, when the support member 50 is arranged on the energy storage device 100, the long side surface portion 111a is swollen starting from the position (position of the point P2) of the long side surface portion 111a which faces the extending portion end edge 55 of the support member 50, so that stress is concentrated on the position which faces the extending portion end edge 55. By arranging the support member 50 on the energy storage device 100 in this manner, the portion where stress is concentrated can be shifted from the position of the joining portion 113 to the position which faces the extending portion end edge 55, so that concentration of stress on the joining portion 113 can be suppressed. With such a configuration, it is possible to suppress damage of the joining portion 113 and hence, it is possible to suppress damage of the case 110 of the energy storage device 100. FIG. 7 is a view for explaining an effect obtained by the energy storage apparatus 1 according to the present embodiment. To be more specific, the part (a) of FIG. 7 is a conceptual view of a case where the support member 50 is not arranged on the energy storage device 100, and the part (b) of FIG. 7 is a conceptual view of a case where the support member 50 is arranged on the energy storage device 100.

The support member 50 extends in an elongated shape along the joining portion 113 in a state of mounting over the joining portion 113. By arranging the support member 50 so as to mount over the joining portion 113 in this manner, the joining portion 113 can be reinforced, and when the case 110 is swollen, stress can be concentrated on the boundary portion between the portion supported by the support member 50 and the portion not supported in the long side surface portion 111a. As a result, it is possible to suppress concentration of stress on the joining portion 113 while reinforcing the joining portion 113, and it is thus possible to suppress damage of the joining portion 113.

In the support member 50, when viewed from the normal direction of the long side surface portion 111a, the extending portion end edge 55 which is an end edge on the direction side from the joining portion 113 toward the flat portion 141 of the electrode assembly 140 is arranged between the joining portion 113 and the flat portion 141. In the case 110 of the energy storage device 100, a portion of the long side surface portion 111a which faces the flat portion 141 of the electrode assembly 140 is likely to swell. Accordingly, the extending portion end edge 55 of the support member 50 is arranged between the joining portion 113 of the case 110 and the flat portion 141 of the electrode assembly 140. As a result, since the boundary portion between the portion supported by the support member 50 and the portion not supported in the long side surface portion 111a is arranged between the joining portion 113 and the flat portion 141, stress can be concentrated between the joining portion 113 and the flat portion 141 when the case 110 is swollen. If stress can be concentrated between the joining portion 113 and the flat portion 141, it is possible to suppress concentration of stress on the joining portion 113, and it is possible to suppress damage of the joining portion 113, so that it is possible to suppress damage of the case 110 of the energy storage device 100.

The support member 50 is formed to have higher rigidity than the holding member (the spacer end portion 420 (and the spacer body portion 410)) which holds the support member 50. The long side surface portion 111a of the case 110 of the energy storage device 100 is supported by the support member 50 having relatively high rigidity in this manner, so that the long side surface portion 111a can be firmly supported. If the long side surface portion 111a can be firmly supported by the support member 50, it is possible to suppress concentration of stress on the joining portion 113 of the case 110 when the case 110 is swollen. With such a configuration, it is possible to suppress damage of the joining portion 113 and hence, it is possible to suppress damage of the case 110 of the energy storage device 100.

The support member 50 which is a metal member is formed integrally with the holding member which is a resin member. By forming the support member 50 made of metal integrally with the holding member made of resin in this manner, the support member 50 can be easily held by the holding member, the number of parts can be reduced, and the electrical insulation can be improved, so that the energy storage apparatus 1 can be easily manufactured. As a result, it is possible to easily realize a configuration which suppresses damage of the case 110 of the energy storage device 100.

The support member 50 includes the extending portion 51 extending along the joining portion 113 of the case 110 of the energy storage device 100, and the protruding portions (the pair of first support protruding portions 52, the second support protruding portion 53, and the pair of third support protruding portions 54) protruding from the extending portion 51. Since the support member 50 can be reinforced by providing the protruding portions in the support member 50 in this manner, the long side surface portion 111a of the case 110 can be firmly supported by the support member 50 having high strength. With such a configuration, when the case 110 is swollen, it is possible to suppress concentration of stress on the joining portion 113 of the case 110, and it is possible to suppress damage of the joining portion 113, so that it is possible to suppress damage of the case 110 of the energy storage device 100.

The protruding portions of the support member 50 are arranged so as to extend along the joining portion 113 of the case 110 of the energy storage device 100. Since the protruding portions of the support member 50 extend along the joining portion 113 in this manner, the portion of the support member 50 along the joining portion 113 can be reinforced, and thus the position of the long side surface portion 111a of the case 110 along the joining portion 113 can be firmly supported. With such a configuration, when the case 110 is swollen, it is possible to further suppress concentration of stress on the joining portion 113 of the case 110, and it is possible to further suppress damage of the joining portion 113, so that it is possible to further suppress damage of the case 110 of the energy storage device 100. In particular, the central portion at the position along the joining portion 113 is most likely to be swollen, but since the central portion can also be firmly supported by the protruding portions, it is possible to suppress the swelling of the central portion. Also with such a configuration, when the case 110 is swollen, it is possible to further suppress damage of the joining portion 113, so that it is possible to further suppress damage of the case 110 of the energy storage device 100.

Although the case 110 of the energy storage device 100 at the end portion of the plurality of energy storage devices 100 tends to further swell, it is possible to suppress damage of the case 110 of the energy storage device 100 at the end portion by providing the support member 50 on the end spacer 400.

5 Description of Modification Example

First Modification Example

Figure 8:
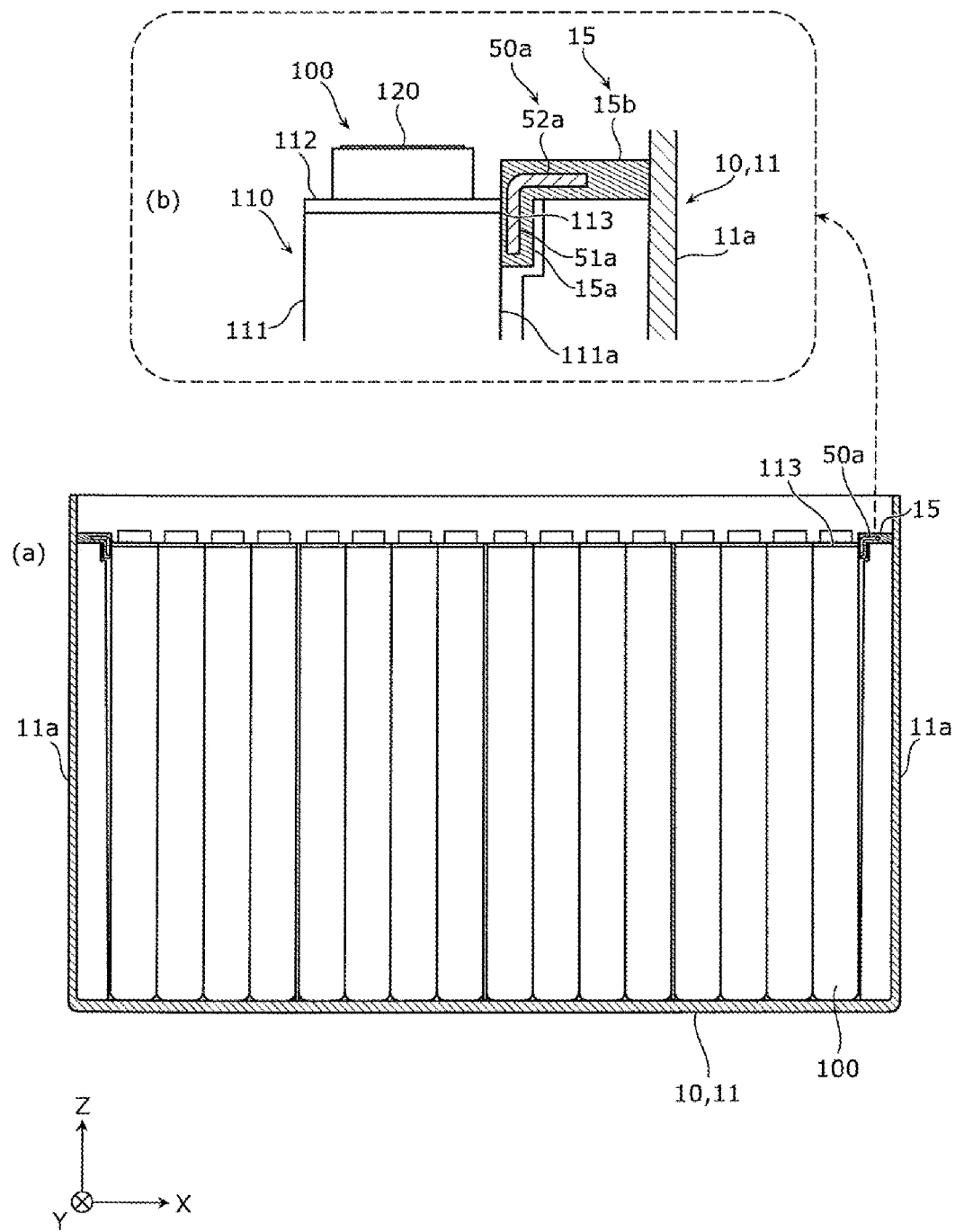
FIG. 8 is a cross-sectional view showing a configuration of a support member and a periphery thereof according to a first modification example of the embodiment.

Next, a first modification example of the above-mentioned embodiment will be described. FIG. 8 is a cross-sectional view showing a configuration of a support member 50a and a periphery thereof according to the first modification example of the present embodiment. To be more specific, the part (a) of FIG. 8 shows the outer case body 11, the plurality of energy storage devices 100, a pair of support members 50a, a pair of holding members 15, and the like by omitting an outer case lid body, a bus bar frame, bus bars, and the like included in an energy storage apparatus. The part (b) of FIG. 8 shows the configuration of the support member 50a and the periphery thereof in an enlarged manner.

As shown in FIG. 8, the energy storage apparatus in the present modification example is an energy storage apparatus of a compression-less type (non-pressurized installation type, non-pressurized stationary type) which does not include members which press the energy storage devices 100 such as the end spacers 400, the end plates 500, and the side plates 600 according to the above-mentioned embodiment. For this reason, in the present modification example, the holding members 15 made of resin or the like which hold the support members 50a made of metal or the like are attached to the outer case body 11 of the outer case 10.

Similarly to the support member 50 in the above-mentioned embodiment, the support member 50a is a member which is arranged so as to extend in an elongated shape along the joining portion 113 at a position outside the case 110 of the energy storage device 100 and along the joining portion 113 in the long side surface portion 111a of the case 110, and supports the long side surface portion 111a. To be more specific, the support member 50a includes an extending portion 51a which extends in the Y-axis direction so as to face the long side surface portion 111a, and a support protruding portion 52a which protrudes in the X-axis plus direction from an end portion of the extending portion 51a on the Z-axis plus direction side and extends in the Y-axis direction. The extending portion 51a has the same configuration as the extending portion 51 of the support member 50 in the above-mentioned embodiment. The support protruding portion 52a protrudes in a direction away from the energy storage device 100, and interference with the electrode terminals 120 and the gas release valve 112a does not need to take into consideration. Therefore, the support protruding portion 52a extends in the Y-axis direction by the same protruding amount in the X-axis plus direction.

The holding member 15 includes a first holding portion 15a which extends in the Y-axis direction so as to face the long side surface portion 111a, and a second holding portion 15b which protrudes in the X-axis plus direction from an end portion of the first holding portion 15a on the Z-axis plus direction side and extends in the Y-axis direction. The first holding portion 15a is a portion in which the extending portion 51a is arranged, and the second holding portion 15b is a portion in which the support protruding portion 52a is arranged. That is, the support member 50a and the holding member 15 are integrally formed (integrated) by, for example, insert molding. The holding member 15 integrated with the support member 50a is attached to a side wall 11a of the outer case body 11.

A method of attaching the holding member 15 to the outer case body 11 may be any method such as fixing by engagement, fitting, insertion, or the like, adhesion by an adhesive, a double-sided tape, or the like, welding by heat welding or the like, fastening by a screw, a bolt, a nut, or the like, or joining by caulking, welding, or the like. The holding member 15 may be formed integrally with the outer case body 11, may be attached to a portion other than the side wall 11a of the outer case body 11, or may be attached to the outer case lid body 12. The configuration of the energy storage device 100 and the configuration other than those described above are the same as those of the above-mentioned embodiment.

As described above, the energy storage apparatus according to the present modification example has the same features as those of the above-mentioned embodiment and hence, it is possible to obtain the same effects as those of the above-mentioned embodiment. That is, also in the compression-less type energy storage apparatus, similarly to the above-mentioned embodiment, it is possible to obtain such an effect that damage of the case 110 of the energy storage device 100 can be suppressed.

Second Modification Example

Figure 9:
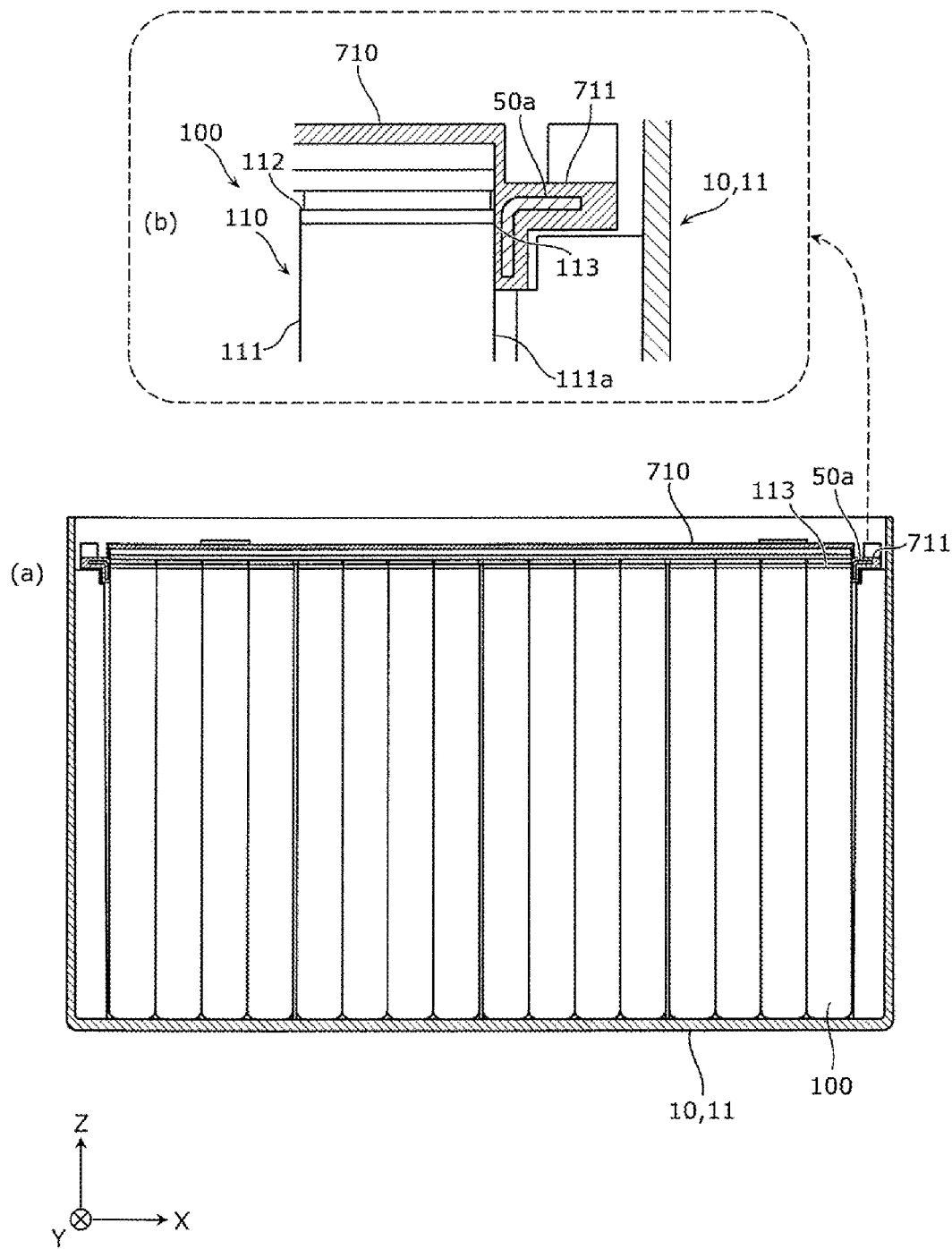
FIG. 9 is a cross-sectional view showing a configuration of the support member and a periphery thereof according to a second modification example of the embodiment.

Next, a second modification example of the above-mentioned embodiment will be described. FIG. 9 is a cross-sectional view showing a configuration of the support member 50a and a periphery thereof according to the second modification example of the present embodiment. To be more specific, the part (a) of FIG. 9 shows the outer case body 11, the plurality of energy storage devices 100, bus bar frames 710 including the pair of support members 50a, and the like by omitting an outer case lid body, a bus bar, and the like included in an energy storage apparatus. The part (b) of FIG. 9 shows the configuration of the support member 50a and the periphery thereof in an enlarged manner.

As shown in FIG. 9, the energy storage apparatus in the present modification example includes holding members 711 instead of the holding members 15 in the above-mentioned first modification example, and the holding members 711 are formed integrally with the bus bar frame 710. That is, the bus bar frame 710 integrally includes the holding members 711 which have the same shape as the holding members 15 in the above-mentioned first modification example and are integrated with the support members 50a. The bus bar frame 710 having such a configuration can be formed by insert molding similarly to the above-mentioned embodiment and first modification example.

As described above, the energy storage apparatus according to the present modification example also has the same features as those of the above-mentioned embodiment and hence, it is possible to obtain the same effects as those of the above-mentioned embodiment. In the present modification example, the compression-less type energy storage apparatus has been exemplified, but the present invention can also be applied to the same compression-type energy storage apparatus as the above-mentioned embodiment.

Third Modification Example

Figure 10:
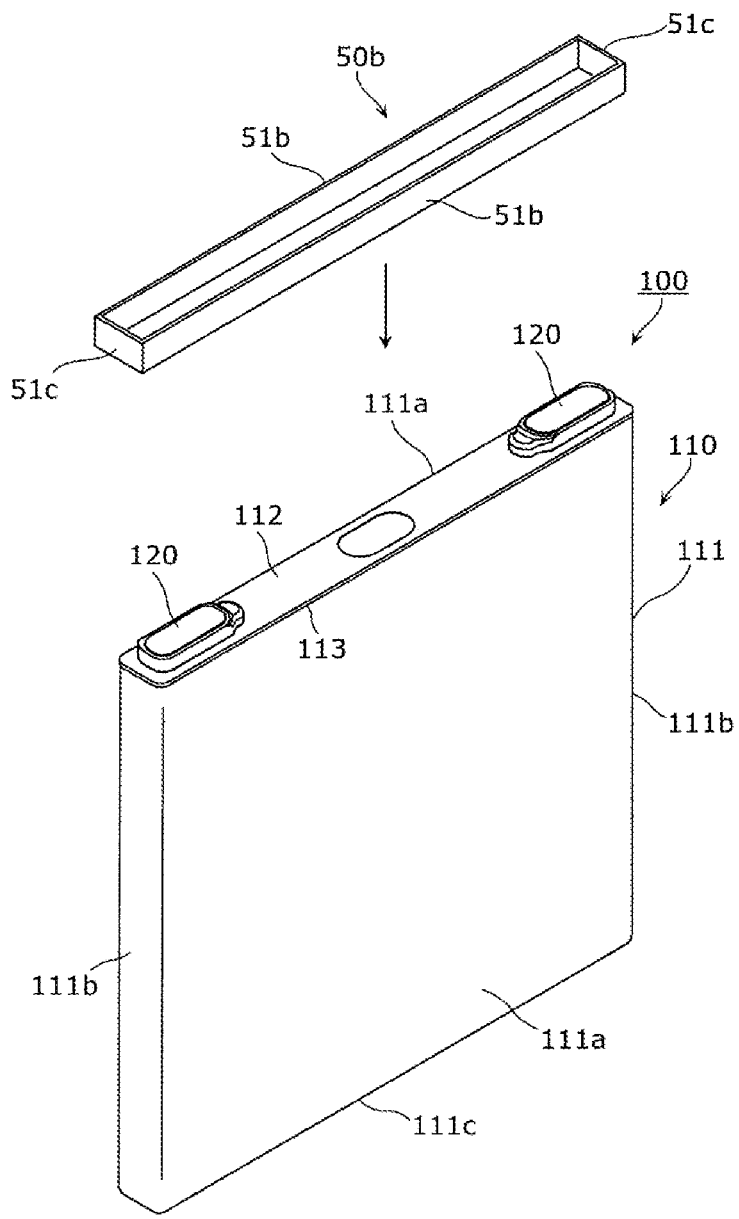
FIG. 10 is a perspective view showing a configuration of a support member according to a third modification example of the embodiment.

Next, a third modification example of the above-mentioned embodiment will be described. FIG. 10 is a perspective view showing a configuration of a support member 50b according to the third modification example of the present embodiment. To be more specific, FIG. 10 shows a configuration at the time of attaching the support member 50b on the energy storage device 100.

As shown in FIG. 10, the support member 50b in the present modification example is formed in an annular shape so as to surround the periphery of the end portion of the case 110 of the energy storage device 100 on the Z-axis plus direction side. That is, the support member 50b includes two extending portions 51b facing the two long side surface portions 111a of the case 110 and two extending portions 51c facing the two short side surface portions 111b of the case 110.

To be more specific, the extending portions 51b are each a portion which is arranged at a position along the joining portion 113 in the long side surface portion 111a of the case 110 so as to extend in an elongated shape in the Y-axis direction along the joining portion 113 and supports the long side surface portion 111a. That is, the extending portions 51b are portions which have the same shape and are arranged at the same position as the extending portion 51 of the above-mentioned embodiment and the extending portion 51a of the first and second modification examples so as to sandwich the two long side surface portions 111a of the case 110.

The extending portions 51c are each a portion which is arranged at a position along the joining portion 113 in the short side surface portion 111b of the case 110 so as to extend in an elongated shape in the X-axis direction along the joining portion 113 and supports the short side surface portion 111b. That is, the extending portions 51c are each a rectangular flat-plate-like portion having both ends connected to the extending portions 51b and arranged so as to sandwich the two short side surface portions 111b of the case 110.

When the support member 50b is a conductive member made of metal or the like, the support member 50b may be insulated by insulating coating or the like, or may be held by an insulating holding member made of resin or the like. As in the above-mentioned second modification example, the support member 50b may be formed integrally with the bus bar frame or other members. That is, the bus bar frame or the like may include a holding member which holds the support member 50b and the support member 50b having higher rigidity than the holding member. The support member 50b may include a protruding portion similar to the protruding portion (the first support protruding portions 52, the second support protruding portion 53, the third support protruding portions 54, or the support protruding portion 52a) of the above-mentioned embodiment or first or second modification example.

As described above, the energy storage apparatus according to the present modification example also has the same features as those of the above-mentioned embodiment and hence, it is possible to obtain the same effects as those of the above-mentioned embodiment. In particular, in the present modification example, since the support members 50b can be arranged for all the energy storage devices 100 in the energy storage device, it is possible to suppress damage of the cases 110 of all the energy storage devices 100.

Fourth Modification Example

Figure 11:
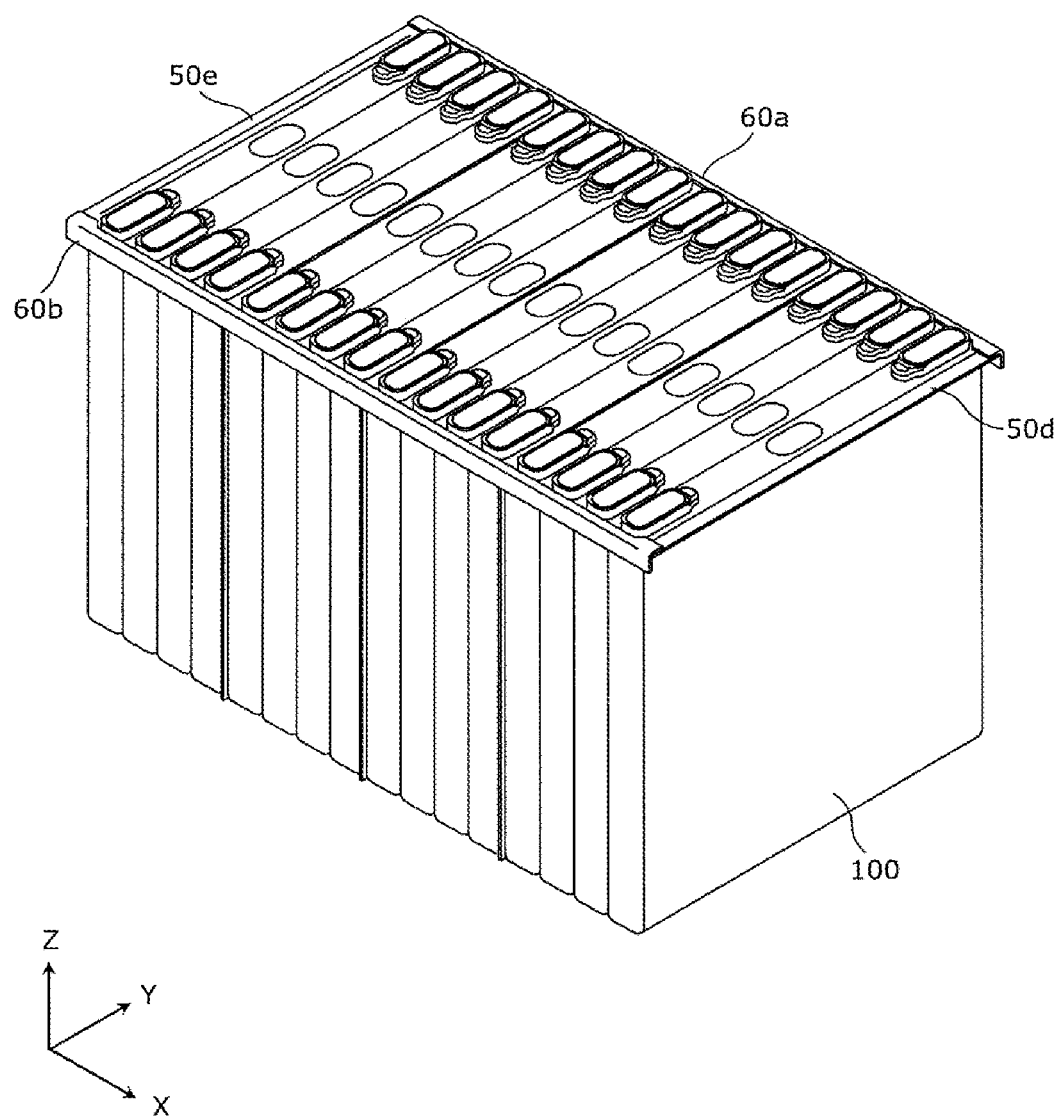
FIG. 11 is a perspective view showing a configuration where support members according to a fourth modification example of the embodiment are arranged on the energy storage devices together with a first connecting member and a second connecting member.
Figure 12:
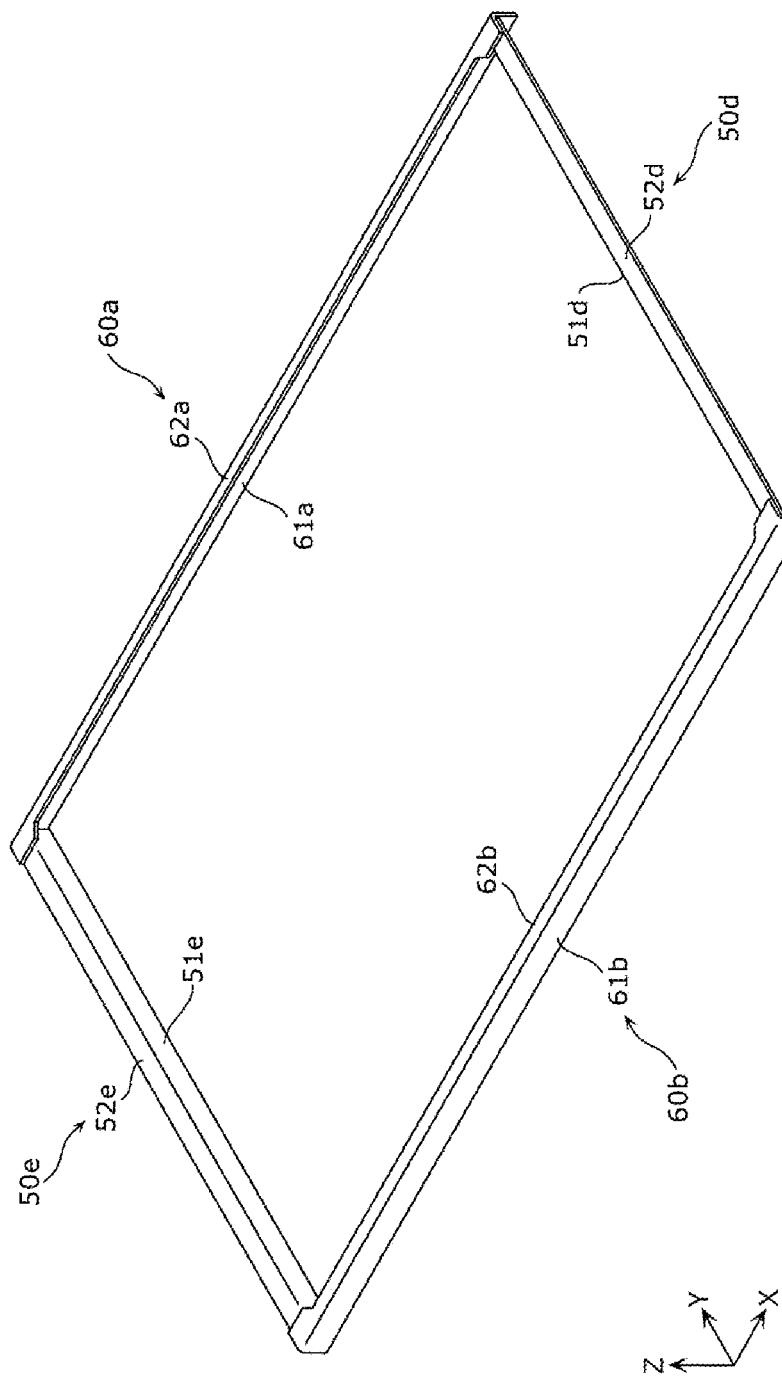
FIG. 12 is a perspective view showing a configuration of the support members, the first connecting member, and the second connecting member according to the fourth modification example of the embodiment.

Next, a fourth modification example of the above-mentioned embodiment will be described. FIG. 11 is a perspective view showing a configuration where support members 50d and 50e according to the fourth modification example of the present embodiment are arranged on the energy storage devices 100 together with a first connecting member 60a and a second connecting member 60b. FIG. 12 is a perspective view showing a configuration of the support members 50d and 50e, the first connecting member 60a, and the second connecting member 60b according to the fourth modification example of the present embodiment.

As shown in FIG. 11, the support members 50d and 50e in the present modification example are formed in an annular shape (frame shape) so as to surround the periphery of the end portions of the plurality of energy storage devices 100 on the Z-axis plus direction side together with the first connecting member 60a and the second connecting member 60b. That is, the support member 50d is arranged on the X-axis plus direction side of the plurality of energy storage devices 100, and the support member 50e is arranged on the X-axis minus direction side of the plurality of energy storage devices 100. The first connecting member 60a is arranged on the Y-axis plus direction side of the plurality of energy storage devices 100, and the second connecting member 60b is arranged on the Y-axis minus direction side of the plurality of energy storage devices 100. The two support members 50d and 50e, the first connecting member 60a, and the second connecting member 60b are annularly (in a frame shape) arranged along the joining portions 113 so as to surround the periphery of the plurality of energy storage devices 100.

To be more specific, the two support members 50d and 50e are arranged at positions along the joining portions 113 in the long side surface portions 111a of the cases 110 of the energy storage devices 100 on both sides in the X-axis direction so as to extend in an elongated shape along the joining portions 113, and support the long side surface portions 111a. The first connecting member 60a and the second connecting member 60b extend along the plurality of energy storage devices 100 in the arrangement direction of the plurality of energy storage devices 100 (X-axis direction) and are connected to the two support members 50d and 50e, respectively. That is, one end of each of the two support members 50d and 50e is connected to the first connecting member 60a, and the other end of each of the two support members 50d and 50e is connected to the second connecting member 60b. With such a configuration, the two support members 50d and 50e sandwich the plurality of energy storage devices 100 in the arrangement direction thereof (X-axis direction), and the first connecting member 60a and the second connecting member 60b sandwich the plurality of energy storage devices 100 in the Y-axis direction.

More specifically, as shown in FIG. 12, the support member 50d has the same configuration as the support member 50a in the above-mentioned first and second modification examples described above. That is, the support member 50d includes an extending portion 51d having the same configuration as the extending portion 51a of the support member 50a, and a support protruding portion 52d having the same configuration as the support protruding portion 52a of the support member 50a. The support member 50e is obtained by rotating the support member 50d about the Z axis by 180°, and includes an extending portion 51e and a support protruding portion 52e.

The first connecting member 60a is an L-shaped member as viewed from the X-axis direction, and includes a side wall portion 61a extending in the X-axis direction in parallel with the XZ plane, and an upper wall portion 62a protruding in the Y-axis minus direction from the side wall portion 61a and extending in the X-axis direction in parallel with the XY plane. An end portion of the upper wall portion 62a on the X-axis plus direction side has a wide width in the Y-axis direction, and an end portion of the support protruding portion 52d of the support member 50d on the Y-axis plus direction side is connected (joined) to the end portion by welding or the like. An end portion of the upper wall portion 62a on the X-axis minus direction side has a wide width in the Y-axis direction, and an end portion of the support protruding portion 52e of the support member 50e on the Y-axis plus direction side is connected (joined) to the end portion by welding or the like.

Similarly, the second connecting member 60b is an L-shaped member as viewed from the X-axis direction, and includes a side wall portion 61b extending in the X-axis direction in parallel with the XZ plane, and an upper wall portion 62b protruding in the Y-axis plus direction from the side wall portion 61b and extending in the X-axis direction in parallel with the XY plane. An end portion of the upper wall portion 62b on the X-axis plus direction side has a wide width in the Y-axis direction, and an end portion of the support protruding portion 52d of the support member 50d on the Y-axis minus direction side is connected (joined) to the end portion by welding or the like. An end portion of the upper wall portion 62b on the X-axis minus direction side has a wide width in the Y-axis direction, and an end portion of the support protruding portion 52e of the support member 50e on the Y-axis minus direction side is connected (joined) to the end portion by welding or the like.

As described above, the energy storage apparatus according to the present modification example also has the same features as those of the above-mentioned embodiment and hence, it is possible to obtain the same effects as those of the above-mentioned embodiment. In particular, in the present modification example, the first connecting member 60a which extends along the plurality of energy storage devices 100 and is connected to the support member 50d (or 50e) is arranged. By connecting the first connecting member 60a to the support member 50d (or 50e) in this manner, the support member 50d (or 50e) can be positioned at a predetermined position. The plurality of energy storage devices 100 can be reinforced by the first connecting member 60a.

Each of the two support members 50d and 50e which sandwich the plurality of energy storage devices 100 in the arrangement direction thereof is connected to the first connecting member 60a. By sandwiching the plurality of energy storage devices 100 between the two support members 50d and 50e in this manner, even if the plurality of energy storage devices 100 are to be swollen, it is possible to suppress the swelling and hence, it is possible to suppress damage of the joining portions 113 of the cases 110 of the energy storage devices 100.

One ends of the two support members 50d and 50e are connected to the first connecting member 60a, and the other ends of the two support members 50d and 50e are connected to the second connecting member 60b. By connecting the two connecting members (the first connecting member 60a and the second connecting member 60b) to both ends of the two support members 50d and 50e in this manner, the two support members 50d and 50e and the two connecting members surround the periphery of the plurality of energy storage devices 100. With such a configuration, even if the plurality of energy storage devices 100 are to be swollen, it is possible to more firmly suppress the swelling and hence, it is possible to further suppress damage of the joining portions 113 of the cases 110 of the energy storage devices 100.

In the present modification example, when the support members 50d and 50e are conductive members made of metal or the like, the support members 50d and 50e may be insulated by insulating coating or the like, or may be held by an insulating holding member made of resin or the like. As in the above-mentioned second modification example, the support members 50d and 50e may be formed integrally with the bus bar frame or other members. That is, the bus bar frame or the like may include a holding member which holds the support members 50d and 50e and the support members 50d and 50e having higher rigidity than the holding member. The same applies to the first connecting member 60a and the second connecting member 60b.

Other Modification Examples

Although the energy storage apparatus according to each of the present embodiment and the modification examples thereof has been described above, the present invention is not limited to the above-mentioned embodiment and the modification examples thereof. That is, the embodiment and the modification examples thereof disclosed herein are illustrative in all respects and are not restrictive, and the scope of the present invention is indicated by the claims, and includes all modifications within the meaning and scope equivalent to the claims.

In the above-mentioned embodiment and the first and second modification examples, the support members 50, 50a are provided on the end spacers 400, the outer case body 11, or the bus bar frame 710, but the member on which the support members are provided is not particularly limited. The support members may be provided on the intermediate spacers 300, and in this case, it is also possible to suppress damage of the cases 110 of the energy storage devices 100 other than the end portions among the plurality of energy storage devices 100. Further, the support members may be provided on both the end spacers 400 and the intermediate spacers 300, and in this case, it is possible to suppress damage of the cases 110 of all the energy storage devices 100.

In the above-mentioned embodiment and the first and second modification examples, the support member 50, 50a is a metal member, and is insert-molded on the holding member that is a resin member. However, the materials of the support member and the holding member are not particularly limited, and the support member may be a resin member or a metal member subjected to insulation coating, and may be held by a holding member that is a metal member. The support member may be formed integrally with the holding member by a method different from insert molding. Furthermore, the support member may not be formed integrally with the holding member, and may be held by the holding member by fixing by engagement, fitting, insertion, or the like, adhesion by an adhesive, a double-sided tape, or the like, welding by heat welding or the like, fastening by a screw, a bolt, a nut, or the like, or joining by caulking, welding, or the like.

In the above-mentioned embodiment and the first and second modification examples, the support member 50, 50*a* is arranged inside the holding member according to the shape of the support member, and supports the long side surface portion 111*a* of the case 110 through the holding member. However, the shape of the holding member is not particularly limited, and the support member may be exposed from the holding member. In this case, the support member may directly support the long side surface portion 111*a* of the case 110 without interposing the holding member. In the above-mentioned embodiment and the second modification example, the holding members are formed integrally with the end spacers 400 or the bus bar frame 710. However, similarly to the above-mentioned first modification example, the holding members may be configured separately from the end spacers 400 or the bus bar frame 710, and may be attached to the end spacers 400 or the bus bar frame 710.

In the above-mentioned embodiment and the first, second, and fourth modification examples, the support member 50, 50*a*, 50*d*, or 50*e* is arranged on the long side surface portion 111*a* of the case 110 of the energy storage device 100 to support the long side surface portion 111*a*. However, the support member may be arranged on the short side surface portions 111*b* of the cases 110 of the energy storage devices 100 to support the short side surface portions 111*b*.

In the above-mentioned embodiment and the first, second, and fourth modification examples, the protruding portion (the first support protruding portions 52, the second support protruding portion 53, the third support protruding portions 54, or the support protruding portions 52*a*, 52*d*, or 52*e*) of the support member 50, 50*a*, 50*d*, or 50*e* protrudes in one direction (the plus direction or the minus direction) in the X-axis direction from the end portion of the support member on the Z-axis plus direction side, and extends along the joining portion 113. However, the protruding portion may protrude from any position such as the end portion on the Z-axis minus direction side or the center portion in the Z-axis direction of the support member. The protruding direction is not limited, and the protruding portion may protrude in a direction opposite to the one direction in the X-axis direction or in both directions. The protruding portion may protrude without extending along the joining portion 113. The support member may not include the protruding portion.

In the above-mentioned embodiment and the modification examples thereof, the joining portion 113 is formed on the side corresponding to the side surface portions (the long side surface portions 111*a* and the short side surface portions 111*b*) of the case 110. However, the joining portion 113 may be formed on the side corresponding to the upper surface portion (the case lid body 112) of the case 110. Even in this case, when the support member is arranged at the position along the joining portion 113 on the side surface portion of the case 110, it is possible to suppress the swelling of the side surface portion of the case 110, so that it is possible to suppress concentration of stress on the joining portion 113 and to suppress damage of the case 110. The joining portion 113 may be formed at any position of the case 110, such as being formed to extend in the Z-axis direction on the side surface portion (the long side surface portion 111*a* or the short side surface portion 111*b*) of the case 110, and in any case, it is possible to suppress damage of the case 110 by the support member.

In the above-mentioned embodiment and the modification examples thereof, the electrode assembly 140 of the energy storage device 100 is a so-called vertically-wound winding-type electrode assembly which has a winding axis in the Y-axis direction and is formed by winding plates. However, the configuration of the electrode assembly 140 is not particularly limited, and the electrode assembly 140 may be a so-called horizontally-wound winding-type electrode assembly having a winding axis in the Z-axis direction, a bellows-type electrode assembly obtained by folding plates in a bellows shape, or a stack-type electrode assembly obtained by laminating a plurality of flat-plate-like plates. When the electrode assembly 140 is a bellows-type or stack-type electrode assembly, a portion of the plate where the active material is formed (a portion other than the tab) becomes the flat portion 141.

In the above-mentioned embodiment and the modification examples thereof, both the configuration of the support member on the X-axis plus direction side and the periphery thereof and the configuration of the support member on the X-axis minus direction side and the periphery thereof have the above-mentioned configuration. However, either one of the two may not have the above configuration.

A form constructed by freely combining the components included in the above-mentioned embodiment and the modification examples thereof is also included in the scope of the present invention.

The present invention can be realized not only as such an energy storage apparatus but also as a support member (and a holding member) included in the energy storage apparatus.

INDUSTRIAL APPLICABILITY

The present invention can be applied to an energy storage apparatus or the like including an energy storage device such as a lithium ion secondary battery.

DESCRIPTION OF REFERENCE SIGNS 1 energy storage apparatus
10 outer case
11 outer case body
15, 711 holding member
15*a* first holding portion
15*b* second holding portion
50, 50*a*, 50*b*, 50*d*, 50*e* support member
51, 51*a*, 51*b*, 51*c*, 51*d*, 51*e* extending portion
52 first support protruding portion
52*a*, 52*d*, 52*e* support protruding portion
53 second support protruding portion
54 third support protruding portion
55 extending portion end edge
60*a* first connecting member
60*b* second connecting member
61*a*, 61*b* side wall portion
62*a*, 62*b* upper wall portion
100 energy storage device
110 case
111 case body 111a long side surface portion
111b short side surface portion
113 joining portion
140 electrode assembly
141 flat portion
400 end spacer
410 spacer body portion
420 spacer end portion
421 first spacer recessed portion
422 second spacer recessed portion
423 spacer protruding portion
700, 710 bus bar frame

The invention claimed is:

1. An energy storage apparatus comprising:
an energy storage device including a case in which a joining portion is formed; and
a support member which is arranged so as to extend in an elongated shape along the joining portion at a position outside the case and along the joining portion in a side surface portion of the case, and supports the side surface portion; and
a holding member which holds the support member,
wherein the side surface portion includes a long side surface, and a short side surface extending in a direction intersecting the long side surface,
wherein the support member faces the long side surface,
wherein the energy storage device includes an electrode assembly which is arranged inside the case and includes a flat portion formed at a position facing the long side surface,
wherein an end edge of the support member in a direction from the joining portion toward the flat portion is arranged between the joining portion and the flat portion when viewed from a normal direction of the long side surface,
wherein the support member has higher rigidity than the holding member,
wherein the support member is a metal member, and
wherein the holding member is a resin member formed integrally with the support member.

2. The energy storage apparatus according to claim 1, wherein the support member is arranged so as to extend in the elongated shape along the joining portion in a state of mounting over the joining portion when viewed from a normal direction of the side surface portion.

3. The energy storage apparatus according to claim 1, wherein the support member includes:
an extending portion facing the side surface portion and extending along the joining portion; and
a protruding portion protruding from the extending portion in a direction intersecting the side surface portion.

4. The energy storage apparatus according to claim 3, wherein the protruding portion is arranged so as to extend along the joining portion.

5. The energy storage apparatus according to claim 1, wherein the energy storage apparatus includes a plurality of the energy storage devices, and
wherein the energy storage apparatus includes a first connecting member which extends along the plurality of energy storage devices in an arrangement direction of the plurality of energy storage devices and is connected to the support member.

6. The energy storage apparatus according to claim 5, wherein the energy storage apparatus includes a plurality of two of the support members which sandwich the plurality of energy storage devices in the arrangement direction, and
wherein each of two of the support members is connected to the first connecting member.

7. The energy storage apparatus according to claim 6, wherein one end of each of the two of the support members is connected to the first connecting member, and
wherein the energy storage apparatus further includes a second connecting member to which another end of each of the two of the support members is connected.

8. The energy storage apparatus according to claim 1, wherein the electrode assembly has an elliptical shape as viewed from a winding-axis direction, one of a pair of straight line portions of the elliptical shape which face each other comprises the flat portion, and one of a pair of curved line portions which face each other comprise a curved portion.

9. The energy storage apparatus according to claim 1, wherein the flat portion is formed from winding a positive electrode portion.

10. The energy storage apparatus according to claim 1, wherein when the electrode assembly is viewed from a winding-axis direction, one of a pair of straight line portions which face each other comprises the flat portion.

11. An energy storage apparatus comprising:
an energy storage device including a case in which a joining portion is formed;
a support member which is arranged so as to extend in an elongated shape along the joining portion at a position outside the case and along the joining portion in a side surface portion of the case, and supports the side surface portion; and
a holding member which holds the support member,
wherein the side surface portion includes a long side surface, and a short side surface extending in a direction intersecting the long side surface,
wherein the support member faces the long side surface,
wherein the support member has higher rigidity than the holding member,
wherein the support member is a metal member, and
wherein the holding member is a resin member formed integrally with the support member.

12. The energy storage apparatus according to claim 11, wherein the support member is arranged so as to extend in the elongated shape along the joining portion in a state of mounting over the joining portion when viewed from a normal direction of the side surface portion.

13. The energy storage apparatus according to claim 11, wherein the energy storage device includes an electrode assembly which is arranged inside the case and includes a flat portion formed at a position facing the side surface portion, and
wherein an end edge of the support member in a direction from the joining portion toward the flat portion is arranged between the joining portion and the flat portion when viewed from a normal direction of the side surface portion.

14. An energy storage apparatus comprising:
an energy storage device including a case in which a joining portion is formed;
a support member which is arranged so as to extend in an elongated shape along the joining portion at a position outside the case and along the joining portion in a side surface portion of the case, and supports the side surface portion; and
a holding member which holds the support member,
wherein the energy storage device includes an electrode assembly which is arranged inside the case, wherein the side surface portion is arranged between the support member and the electrode assembly, wherein the support member has higher rigidity than the holding member, wherein the support member is a metal member, and wherein the holding member is a resin member formed integrally with the support member.

15. The energy storage apparatus according to claim 14, wherein the support member is arranged so as to extend in the elongated shape along the joining portion in a state of mounting over the joining portion when viewed from a normal direction of the side surface portion.

* * * * *